United States Patent
Jabbaz et al.

(10) Patent No.: US 9,531,550 B2
(45) Date of Patent: Dec. 27, 2016

(54) WIRELESS GATEWAY ADAPTER FOR A POWER-OVER-ETHERNET PORT

(71) Applicant: Ubiquiti Networks, Inc., San Jose, CA (US)

(72) Inventors: Patrick G. Jabbaz, Cupertino, CA (US); Jude Lee, Fremont, CA (US); Bo-Chieh Yang, San Jose, CA (US); Keh-Ming Luoh, Fremont, CA (US); Robert J. Pera, San Jose, CA (US)

(73) Assignee: UBIQUITI NETWORKS, INC., San Jose, CA (US)

( * ) Notice: Subject to any disclaimer, the term of this patent is extended or adjusted under 35 U.S.C. 154(b) by 617 days.

(21) Appl. No.: 13/844,736

(22) Filed: Mar. 15, 2013

(65) Prior Publication Data

US 2014/0115354 A1 Apr. 24, 2014

Related U.S. Application Data

(60) Provisional application No. 61/716,408, filed on Oct. 19, 2012.

(51) Int. Cl.
*G06F 1/00* (2006.01)
*H04L 12/10* (2006.01)
*G06F 1/26* (2006.01)

(52) U.S. Cl.
CPC .............. *H04L 12/10* (2013.01); *G06F 1/266* (2013.01)

(58) Field of Classification Search
CPC ........................................................ H01L 12/10
USPC ......................................................... 713/310
See application file for complete search history.

(56) References Cited

U.S. PATENT DOCUMENTS

| | | | |
|---|---|---|---|
| 2005/0060587 A1* | 3/2005 | Hwang et al. | 713/300 |
| 2006/0128319 A1* | 6/2006 | Van de Water | 455/73 |
| 2008/0294918 A1* | 11/2008 | Dhuyvetter | H04L 12/10 713/310 |
| 2009/0003374 A1* | 1/2009 | Morrissey et al. | 370/463 |
| 2009/0228722 A1* | 9/2009 | Lin | 713/300 |
| 2010/0117816 A1* | 5/2010 | Okada | 340/447 |
| 2010/0218004 A1 | 8/2010 | Cousy | |
| 2012/0257543 A1* | 10/2012 | Baum et al. | 370/255 |
| 2013/0007848 A1* | 1/2013 | Chaskar et al. | 726/4 |

FOREIGN PATENT DOCUMENTS

WO 2006044783 A2 4/2006

* cited by examiner

*Primary Examiner* — Robert Cassity
(74) *Attorney, Agent, or Firm* — Shun Yao; Park, Vaughan, Fleming & Dowler LLP

(57) ABSTRACT

A PoE-enabled wireless device facilitates providing wireless access to a local area network (LAN) by receiving power from an Ethernet cable. The device includes a first Ethernet port that can receive a power signal. The device also includes a second Ethernet port that facilitates coupling the apparatus to the LAN, and includes a wireless module to provide a wireless network connection to the LAN. Specifically, the wireless module receives power from the power signal of the first Ethernet port to provide the wireless network connection. The wireless device can also include a third Ethernet port for providing power and a network connection to a remote network device. The wireless device can use the third Ethernet port to send an external-reset signal to the remote network device, which facilitates remotely resetting a configuration of the remote network device without having to physically access the remote network device.

27 Claims, 21 Drawing Sheets

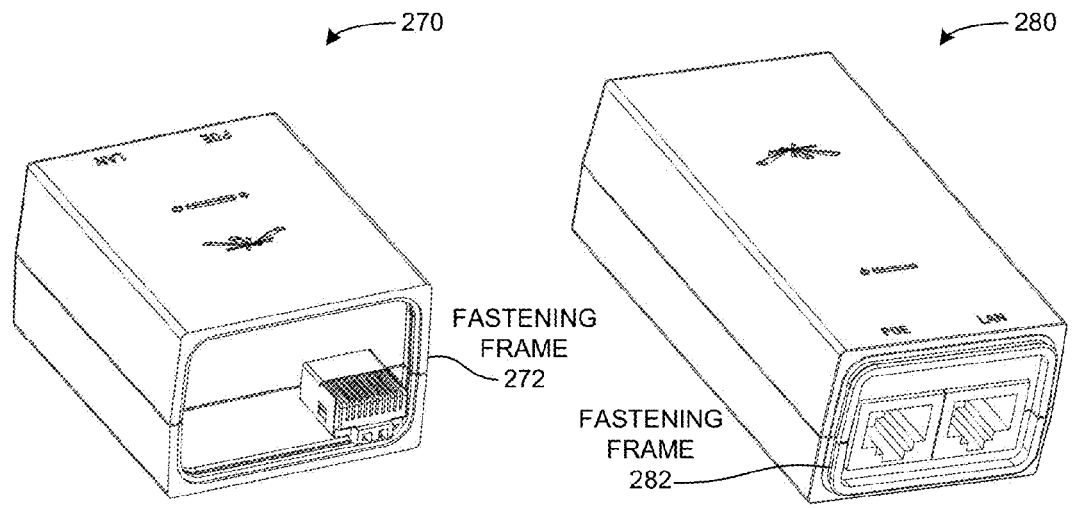
FIG. 2C
FIG. 2D
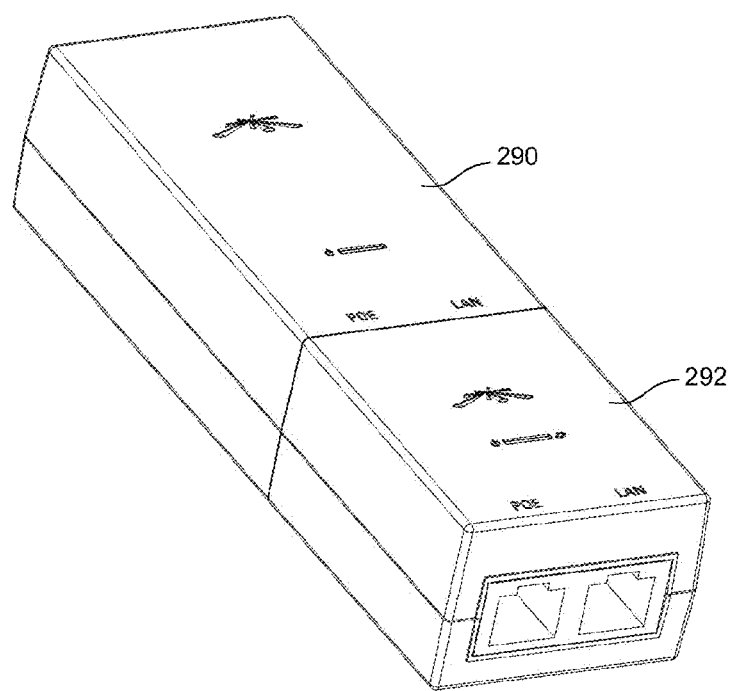
FIG. 2E

WIRELESS GATEWAY ADAPTER FOR A POWER-OVER-ETHERNET PORT

RELATED APPLICATION

This application claims the benefit of U.S. Provisional Application No. 61/716,408, entitled "WIRELESS GATEWAY ADAPTER FOR A POWER-OVER-ETHERNET PORT," by inventors Jude Lee and Robert J. Pera, filed 19 Oct. 2012.

BACKGROUND

Field

This disclosure is generally related to Power-over-Ethernet (PoE) injectors. More specifically, this disclosure is related to a PoE-enabled device that provides wireless access to a local area network, and which may be configured to receive or send external-reset signals over a pin of an Ethernet cable for performing a remote-triggered reboot cycle.

Related Art

Power over Ethernet (PoE) provides a way to safely pass electrical power along with data via an Ethernet cable, such as a category 5 cable. This allows client devices, such as sensor nodes, to receive electrical power without having to place the device near a power outlet. Unfortunately, not all network routers and switches provide electrical power via their Ethernet ports.

Oftentimes users can use a PoE injector, which has its own power supply coupled to a power outlet, to inject electrical power into an Ethernet cable. For example, if the Ethernet cable is coupled to a network router or switch, the Ethernet cable can provide a target network device with access to the router's local area network (LAN), while also providing power for the target network device. However, typical PoE injectors do not provide wireless access to the LAN, and adding a typical wireless LAN access point to the network connection requires access to an additional power outlet.

To make matters worse, network devices that receive power from the PoE injector are oftentimes installed at a remote and hard-to-reach location. For example, a sensor or wireless access point may be installed on a corner of a tall ceiling or on a tall rooftop antenna for maximal coverage, which makes it difficult to access the device for maintenance. If the network device needs to be reset to factory-default settings, a user would typically need to access the device itself to physically hold down a reset button on the device until the device reboots into a factory-default setting.

SUMMARY

One embodiment provides a device that facilitates providing wireless access to a LAN by receiving power from a network cable. The device includes a first network port that can receive a power signal. When the first network port is coupled to a network port of a first external device that provides power over the network port, the first network port receives power from the first external device via the power signal. The device also includes a second network port that facilitates coupling the apparatus to a local-area network (LAN), and includes a wireless module to provide a wireless network connection to the LAN accessible via the second network port. Specifically, the wireless module receives power from the power signal of the first network port to provide the wireless network connection.

In some embodiments, at least the first network port includes an RJ45 port, and the power signal includes a Power-over-Ethernet (PoE) signal.

In some embodiments, the device also includes a third network port to provide a second external device access to the LAN, such that the third network port is coupled to the power signal of the first network port to facilitate providing power to the second external device.

In some embodiments, the device also includes an external-reset-monitoring mechanism configured to monitor a voltage level from a pin of the second network port, wherein the external-reset-monitoring mechanism generates a reset signal when the voltage level is at least equal to a predetermined level. When the device detects a device-reset signal, the device can perform a reset cycle to reset the device into a factory-default setting, such as by loading an initial version of the device firmware, and performs a reboot cycle to load from the initial firmware version. When the device detects a firmware-reset signal, the device can load a previous firmware version from storage, such as a firmware version known to be stable, and performs a reboot cycle to load from the previous firmware version.

In some embodiments, the device also includes an external-reset mechanism for sending an external-reset command to a remote network device. When the external-reset mechanism is activated, such as by a push-button mounted on the device's chassis, or by the device's processor, the external-reset mechanism provides a DC voltage sourced from the power signal to a pin of the third network port.

In some embodiments, the first network port and the second network port are realized using a single network port.

In some embodiments, the power signal provides 0.5 amps of electric current.

In some embodiments, the power signal provides 24 volts.

In some embodiments, the power signal provides 48 volts.

In some embodiments, the wireless module includes a 2.4 GHz antenna.

In some embodiments, the wireless module implements a wireless access point.

BRIEF DESCRIPTION OF THE FIGURES

FIG. 2C illustrates a fastening frame of a PoE-enabled wireless AP in accordance with an embodiment.

FIG. 2D illustrates a fastening frame of a PoE source in accordance with an embodiment.

FIG. 2E illustrates a PoE source coupled to a PoE-enabled wireless AP in accordance with an embodiment.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention relates to interfacing a device, such as a wireless radio antenna or wireless access point (AP), with a power-sourcing equipment (PSE) through power over Ethernet (PoE). In some variation the power-sourcing unit is configured to interface with a removable wireless module to provide wireless communication capability. In some variations, the power-sourcing unit is configured to include reset circuitry to perform remote re-setting or re-booting of a device, such as a wireless radio antenna or wireless access point, that is remotely located from the power-sourcing unit and receives a power supply from the power sourcing unit. For example, a user can attach the device to a PoE injector, which ordinarily just injects power to a local area network's (LAN) Ethernet connection. Thus, by attaching the device to the PoE injector and the Ethernet connection, the user can provide access to the LAN via a PoE-enabled Ethernet port as well as via a wireless channel.

As another example, the user can attach the device to a network router or switch that provides PoE, but that does not provide wireless access to a LAN. Doing so allows the user to easily add a wireless AP functionality to the router without having to use an additional a power outlet. This can be useful when the user's mobile computing device does not include an Ethernet port, as is common in many mobile devices such as smartphones, tablet computers, and some laptops. Hereinafter, the term "network switch" generally refers to a network router or a network switch.

Figure 1A:
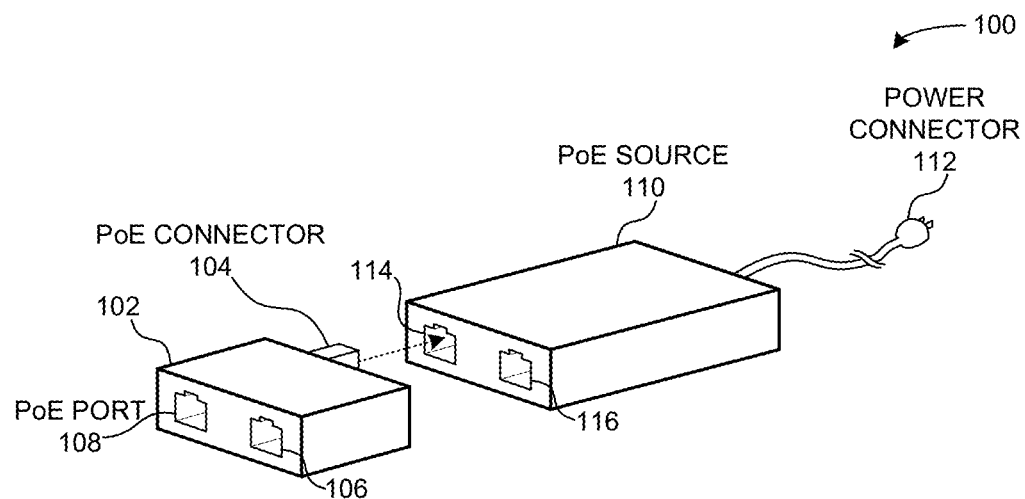
FIG. 1A illustrates an exemplary system that includes a wireless access point (AP) which is powered via a Power-over-Ethernet (PoE) power source in accordance with an embodiment.

FIG. 1A illustrates an exemplary system 100 that includes a wireless AP 102 which is powered via a PoE source 110 in accordance with an embodiment. Wireless AP 102 includes a PoE connector 104, a LAN port 106, and a PoE port 108. The user can provide power to wireless AP 102 by coupling PoE connector 104 directly into PoE port 114 of PoE source 110.

PoE source 110 can include a PoE injector that receives power from a power outlet (e.g., a wall power outlet or a surge protector) via a power connector 112, and provides power to PoE port 114. In some embodiments, PoE source 110 can include a PoE injector that, when coupled to a LAN via an Ethernet port 116, provides access to the LAN via PoE-enabled port 114.

Once the user couples wireless AP 102 to PoE source 110, the user can couple LAN port 106 to a LAN (e.g., to an in-wall Ethernet port or directly to a network router or switch) to configure wireless AP 102 to function as a PoE injector. Specifically, in this configuration, wireless AP 102 provides access to the LAN as well as electrical power via PoE port 108. Additionally, wireless AP 102 also includes a wireless module (e.g., a 2.4 GHz radio and antenna) to provide wireless access to the LAN.

Figure 1B:
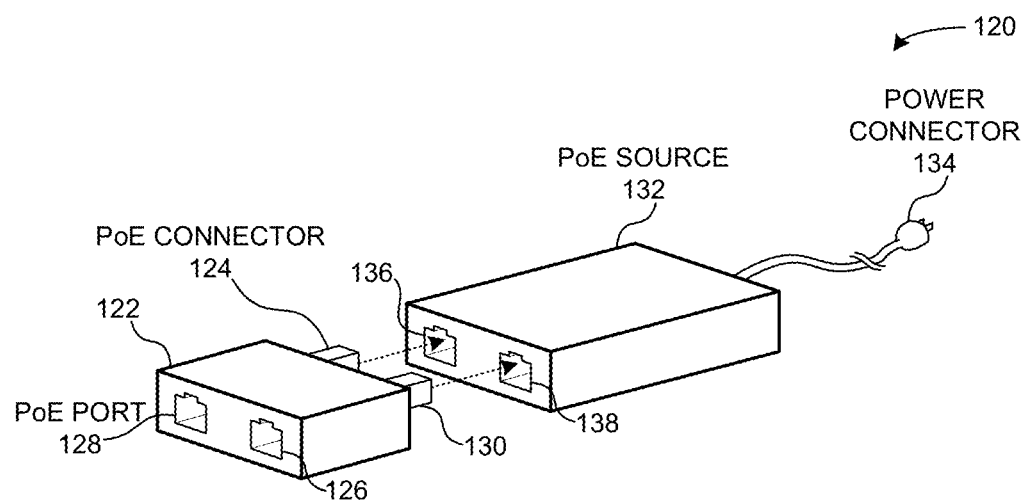
FIG. 1B illustrates an exemplary system that includes a wireless AP which is powered via a PoE source in accordance with an embodiment.

FIG. 1B illustrates an exemplary system 120 that includes a wireless AP 122 which is powered via a PoE source 120 in accordance with an embodiment. Similar to Wireless AP 102 of FIG. 1A, Wireless AP 122 includes a PoE connector 124, a LAN port 126, and a PoE port 128. In addition, wireless AP 122 also includes a stabilizing port 130, which facilitates establishing a stable coupling with dual-port PoE source 130.

Thus, the user can couple PoE connector 124 directly into PoE port 134 of PoE source 130 to provide power to wireless AP 122. In some embodiments, connector 130 is a dummy connector that only serves to stabilize the physical coupling of device 102 to PoE source 110. In some variations, connector 130 provides access to signals from LAN port 126.

Figure 1C:
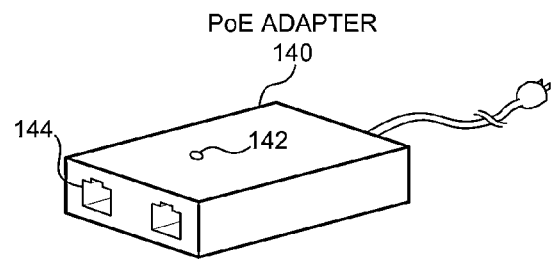
FIG. 1C illustrates an exemplary PoE adapter with a remote-reset button in accordance with an embodiment.

FIG. 1C illustrates an exemplary PoE adapter 140 with an external-reset button 142 in accordance with an embodiment. Specifically, external-reset button 142 facilitates remotely resetting a remote network device to a factory-default setting, without requiring physical access to the network device. When a user presses external-reset button 142, PoE adapter 140

While a user presses and holds external-reset button 142, PoE adapter 140 generates and transmits the reset signal to a remote network device via a floating DC-bias signal over Ethernet pin 3 of port 144, or as a differential signal over Ethernet pin pairs (4,5) and (7,8) of port 144, as is described in more detail in later sections. The remote network device can detect the reset signal, for example, while running a boot loader during a boot or reboot process, at which the remote network device reconfigures itself to factory-default settings and boots from these factory-default settings.

Figure 1D:
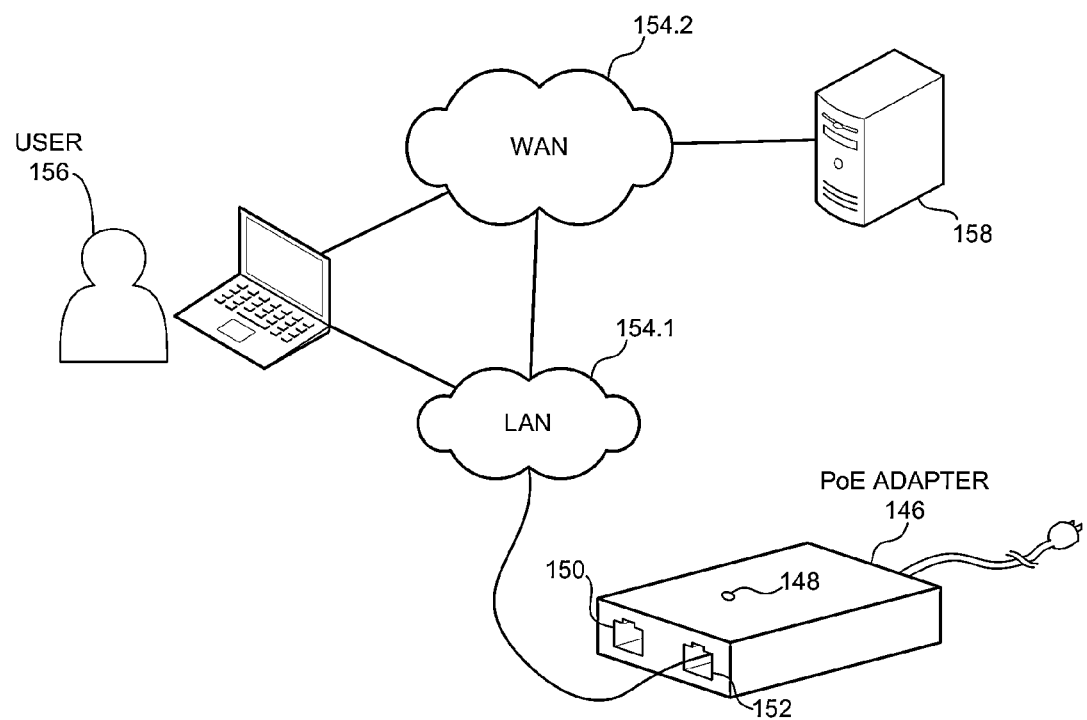
FIG. 1D illustrates an exemplary PoE adapter which can accept a remote-reset command from a built-in remote reset button, or from a remote computing device in accordance with an embodiment.

FIG. 1D illustrates an exemplary PoE adapter 146 which can accept a remote-reset command from a built-in external-reset button 148, or from a remote computing device in accordance with an embodiment. In some embodiments, while a user presses and holds external-reset button 148, PoE adapter 146 generates and transmits the reset signal to a remote network device via Ethernet port 150.

In some other embodiments, PoE adapter 146 can include a microprocessing unit, which can receive instructions from a user's computing device 156 or a cloud-based server computer 158, for sending an external-reset signal to a remote network device over Ethernet port 150. For example, a user 156 can interact with a user interface (UI) that illustrates a status for a remote network device attached to port 150 of PoE adapter 146. If user 156 desires to reset the remote device to default settings, user 156 can select a "reset" button on the UI, which causes PoE adapter 146 to send an external-reset command to the remote device as a floating DC-bias signal over data pins of Ethernet port 150.

In some embodiments, the UI may be generated and hosted as a web page by PoE adapter 146, which and is provided to a personal computing device of user 156 using a hypertext transfer protocol (HTTP). The user's personal computing device can receive the web page via a local area network (LAN) 154.1. Also, when user 156 selects the "reset" button, the user's personal computing device can send commands via the HTTP session (e.g., using asynchronous requests) that configure PoE adapter 146 to send an external-reset signal to a remote network device attached to Ethernet port 150.

In some embodiments, the UI may be hosted by a cloud-based server computer 158 that issues command to PoE adapter 146 via a wide area network 154.2. For example, when the user selects the "reset" button, the user's personal computing device can send the device-reset command to server 158 via the HTTP session, at which point server 158 sends the device-reset command to PoE adapter 146 via data packets over WAN 154.2 and LAN 154.1. Once PoE adapter 146 receives these data packets, PoE adapter 146 generates and transmits the external-reset command to the remote network device as a floating DC-bias signal over data pins of Ethernet port 150.

In some other embodiments, the UI may be provided by a local application running on a personal computing device. When the user selects the "reset" button, the user's personal computing device can send the device-reset command to PoE adapter 146 via data packets over WAN 154.2 and/or LAN 154.1.

PoE adapter 146 can generate and transmit the external-reset command to the remote network device as a floating DC-bias signal over Ethernet pin 3 of port 150, or as a differential signal over Ethernet pin pairs (4,5) and (7,8) of port 150, as is described in more detail in later sections.

Figure 1E:
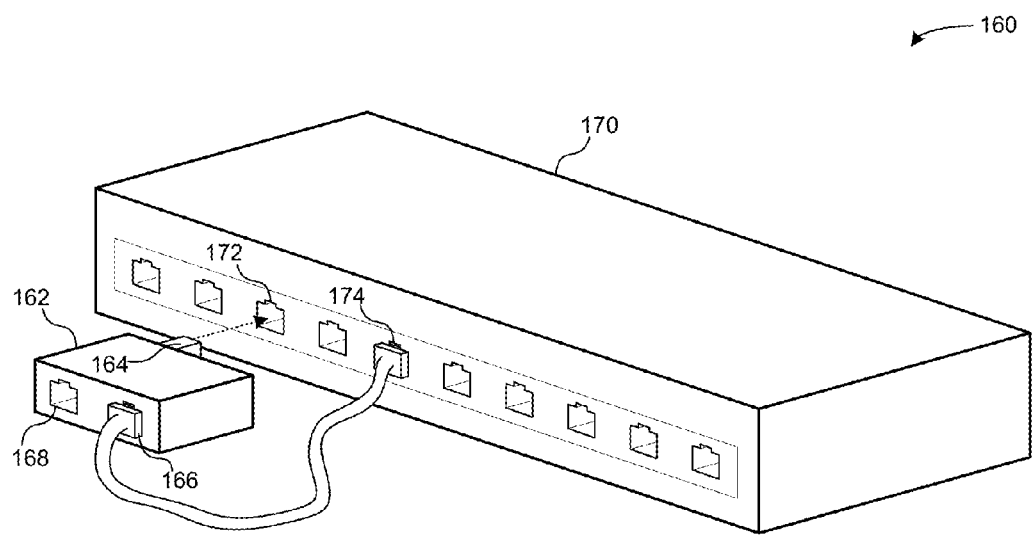
FIG. 1E illustrates an exemplary system that includes a wireless AP which is powered via a PoE-enabled router in accordance with an embodiment.

FIG. 1E illustrates an exemplary system that includes a wireless AP 162 which is powered via a PoE-enabled switch 170 in accordance with an embodiment. Specifically, the user can provide wireless access to a LAN associated with switch 170 by coupling a LAN port 166 of wireless AP 162 to an Ethernet port 174 of switch 170. The user can provide power to wireless AP 162 by coupling a PoE connector 164 of wireless AP 162 directly into a PoE port 172 of switch 170, such that PoE port 172 provides power over Ethernet.

In some embodiments, PoE connector 164 and LAN port 166 are realized using a single Ethernet port or connector (e.g., a single RJ45 male or female jack), such as via PoE port 164. Thus, by receiving a LAN connection and power via a single Ethernet port or connector, wireless AP 162 facilitates providing access to the LAN associated with switch 170 without requiring a separate Ethernet cable, and without occupying more than one Ethernet port on switch 170.

Figure 1F:
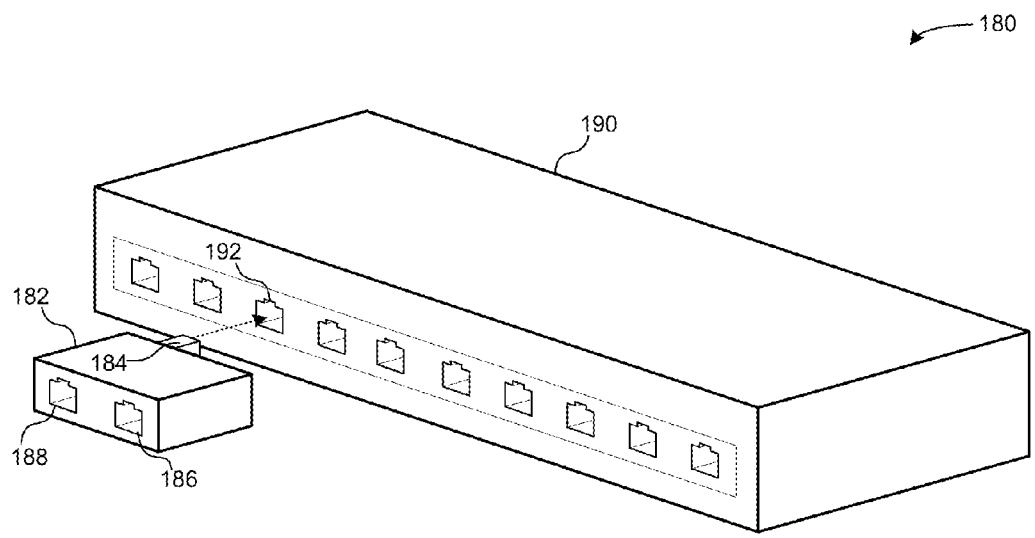
FIG. 1F illustrates an exemplary system that includes a wireless AP which is powered via a PoE-enabled router in accordance with an embodiment.

FIG. 1F illustrates an exemplary system that includes a wireless AP 182 which is powered via a PoE-enabled switch 190 in accordance with an embodiment. Similar to AP 162 of FIG. 1E, the user can provide power to wireless AP 182 by coupling a PoE connector 184 of wireless AP 182 directly into a PoE port 192 of switch 190, such that PoE port 192 provides power over Ethernet.

However, in addition to receiving power via PoE port 184, AP 182 can also receive a LAN connection via PoE port 184, for example, from Ethernet port 192 of PoE-enabled switch 190. Thus, by receiving a LAN connection and power via a single Ethernet port or connector, wireless AP 182 facilitates providing access to the LAN associated with switch 190 without requiring a separate Ethernet cable, and without occupying more than one Ethernet port on switch 190.

Figure 2A:
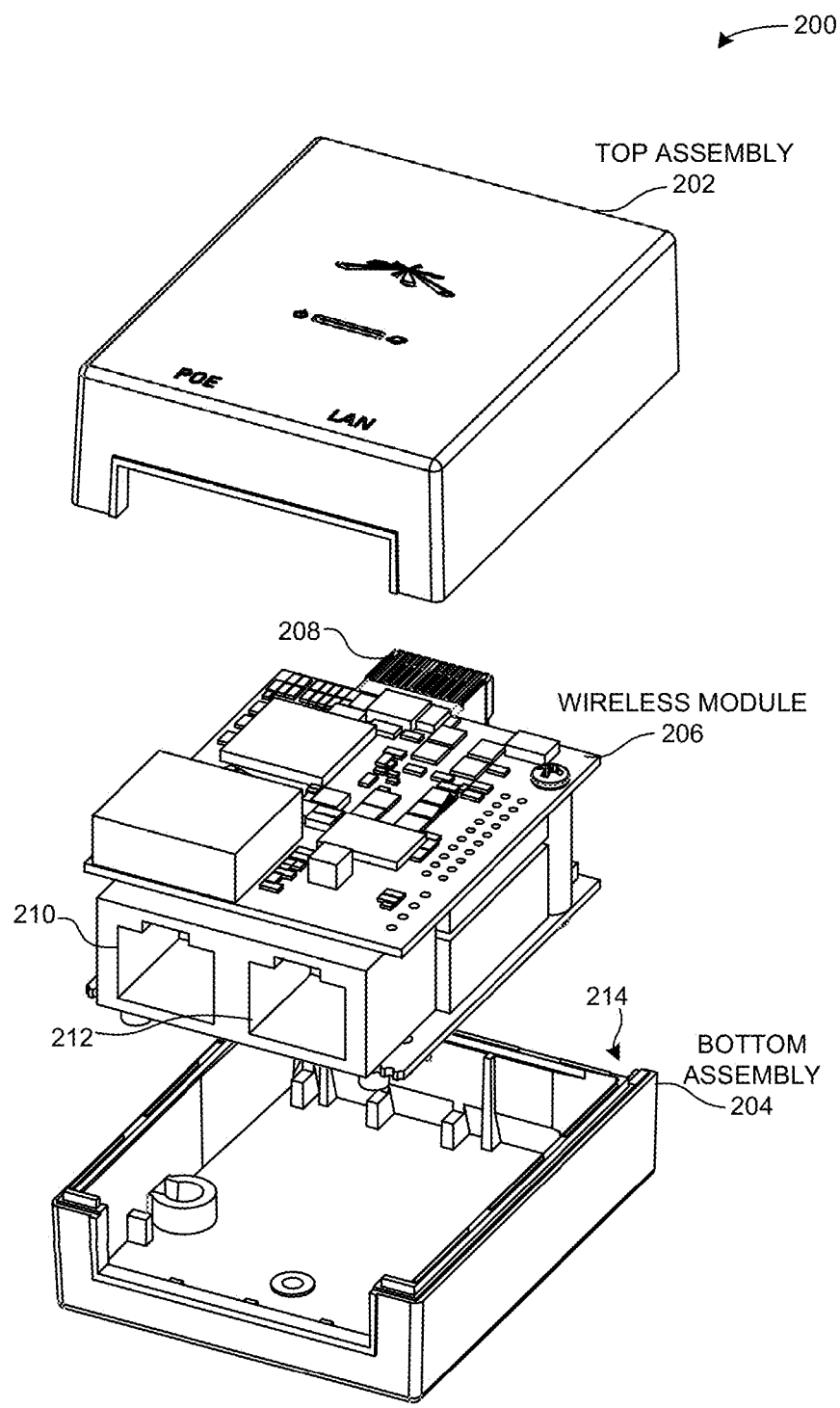
FIG. 2A illustrates an exploded view of the PoE-enabled wireless AP in accordance with an embodiment.

FIG. 2A illustrates an exploded view of the PoE-enabled wireless AP 200 in accordance with an embodiment. Wireless AP 200 includes a top assembly 202 and a bottom assembly 204, which house the internal elements of device 200.

Wireless AP 200 also includes a PoE-enabled Ethernet connector 208, and a PoE-enabled Ethernet port 210. For example, Ethernet connector 208 can include an RJ45 male jack that can receive power from a power-sourcing equipment's (PSE's) RJ45 female jack (e.g., from a network router or switch that provides power over its Ethernet ports). Further, Ethernet port 210 can include an RJ45 female jack that can provide power to a powered device (PD). Thus, wireless AP 200 can operate both as a powered device (receiving power from a PSE via connector 208), and as power-sourcing equipment (providing power to a PD via port 210).

In some variations on these embodiments, Ethernet connector 208 can be realized using an RJ45 female jack, which can be coupled to a PSE's female jack via an Ethernet cable (e.g., a category 5 cable, or a cable of a higher category).

Wireless AP 200 also includes an Ethernet port 212 (e.g., an RJ45 female jack), which the user can connect to a data-sourcing device. For example, the user can use an Ethernet cable (e.g., a category 5 cable) to couple Ethernet port 212 to an Ethernet port of a network router or switch. Wireless AP 200 is configured to inject power into the Ethernet connection, such that port 210 is configured to carry power received from PoE-enabled Ethernet connector 208 as well as data signals from Ethernet port 212.

In some embodiments, the user can connect Ethernet port 212 to a network device that realizes a local area network, such as a network router or switch. In this configuration, PoE-enabled port 210 operates as a power source to the network device, and provides access to the local area network. Further, wireless AP 200 can include a wireless module 206 that receives power from the power signal of PoE-enabled Ethernet port connector 208, and that uses this power to power a wireless radio that provides a wireless network connection to the LAN accessible via Ethernet port 212. Wireless module 206 can include a 2.4 GHz antenna for communicating with one or more client devices that access the LAN wirelessly via wireless module 206.

In some embodiments, PoE-enabled connector 208 and/or PoE-enabled port 210 can transfer 24 volts and 0.5 amps of electricity. However, in some variations, connector 208 and/or port 210 can transfer other amounts of voltage or current. For example, PoE-enabled connector 208 and/or PoE-enabled port 210 can transfer 48 volts and 0.5 amps of electricity.

Figure 2B:
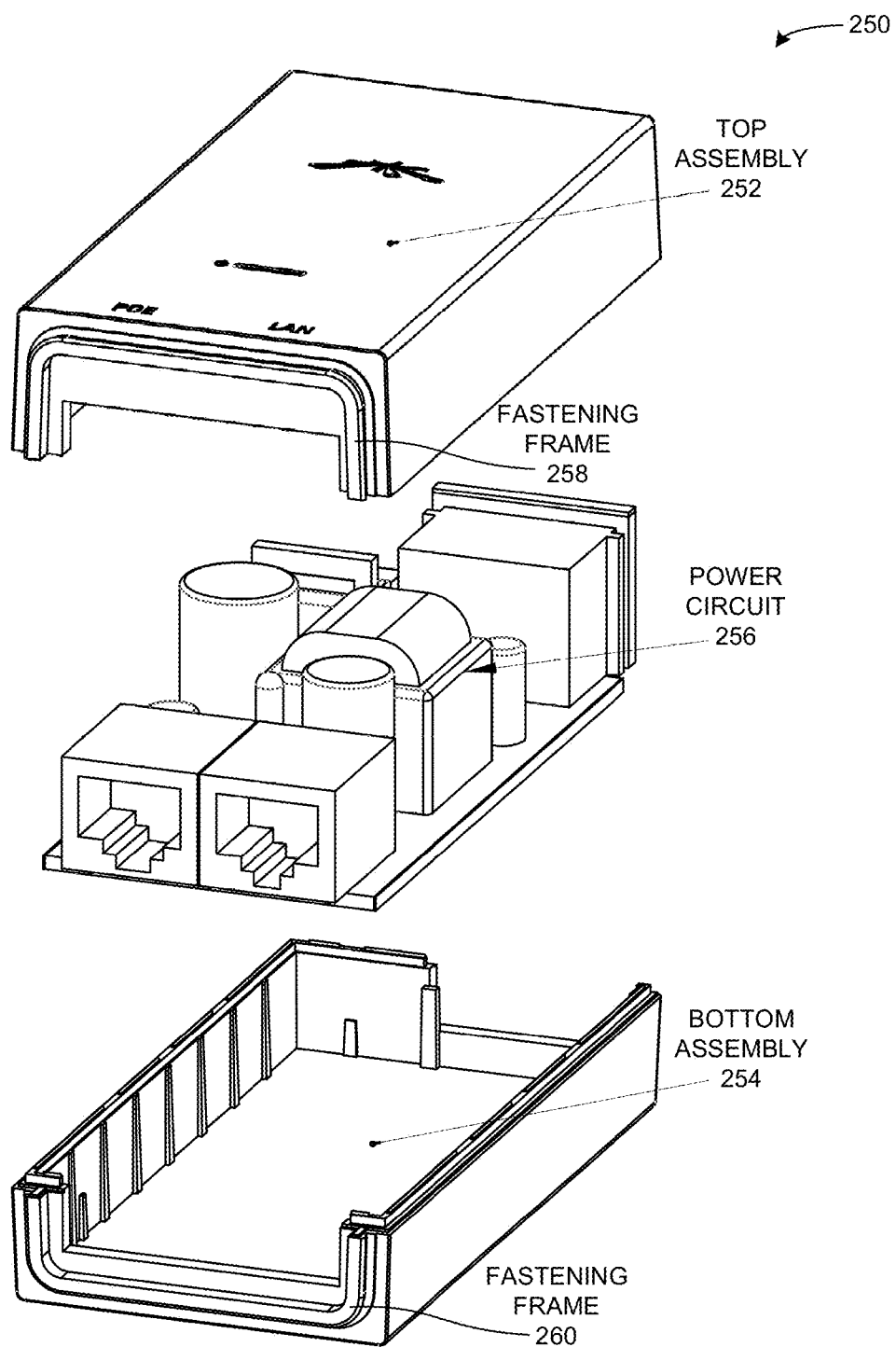
FIG. 2B illustrates an exploded view of the PoE source in accordance with an embodiment.

FIG. 2B illustrates an exploded view of the PoE source 250 in accordance with an embodiment. PoE source 250 includes a top assembly 252 and a bottom assembly 254, which house the internal elements of device 200. Specifically, the internal elements include a power circuit 256, a power port, and two Ethernet ports (e.g., RJ45 female jacks). Also, top assembly 252 and bottom assembly 254 include fastening frames 258 and 260, respectively. Fastening frames 258 and 260 realize a protruding frame element of the assembly that can be inserted into an indentation of a wireless AP module's assembly (e.g., inserted into indentation 214 of the top and bottom assembly of wireless AP 200 of FIG. 2). Inserting fastening frames 258 and 260 into the indentation of the wireless AP module realizes a secured or locked coupling of PoE source 250 to the wireless AP module (or to any other module with an equivalent coupling frame and indentation to wireless AP module 200 of FIG. 2A).

FIG. 2C illustrates a fastening frame 272 of a PoE-enabled wireless AP 270 in accordance with an embodiment. Specifically, fastening frame 272 can include an indentation that realizes a "female" end of a fastener.

FIG. 2D illustrates a fastening frame 282 of a PoE source 280 in accordance with an embodiment. Specifically, fastening frame 282 can include a frame along an edge of an assembly chassis that realizes a "male" end of a fastener.

FIG. 2E illustrates a PoE source 290 coupled to a PoE-enabled wireless AP 292 in accordance with an embodiment. Specifically, PoE source 290 is coupled to wireless AP 292 by inserting the male end of a fastening frame (e.g., fastening frame 282 of FIG. 2D) into the female end of a fastening frame (e.g., fastening frame 272 of FIG. 2C).

Figure 3:
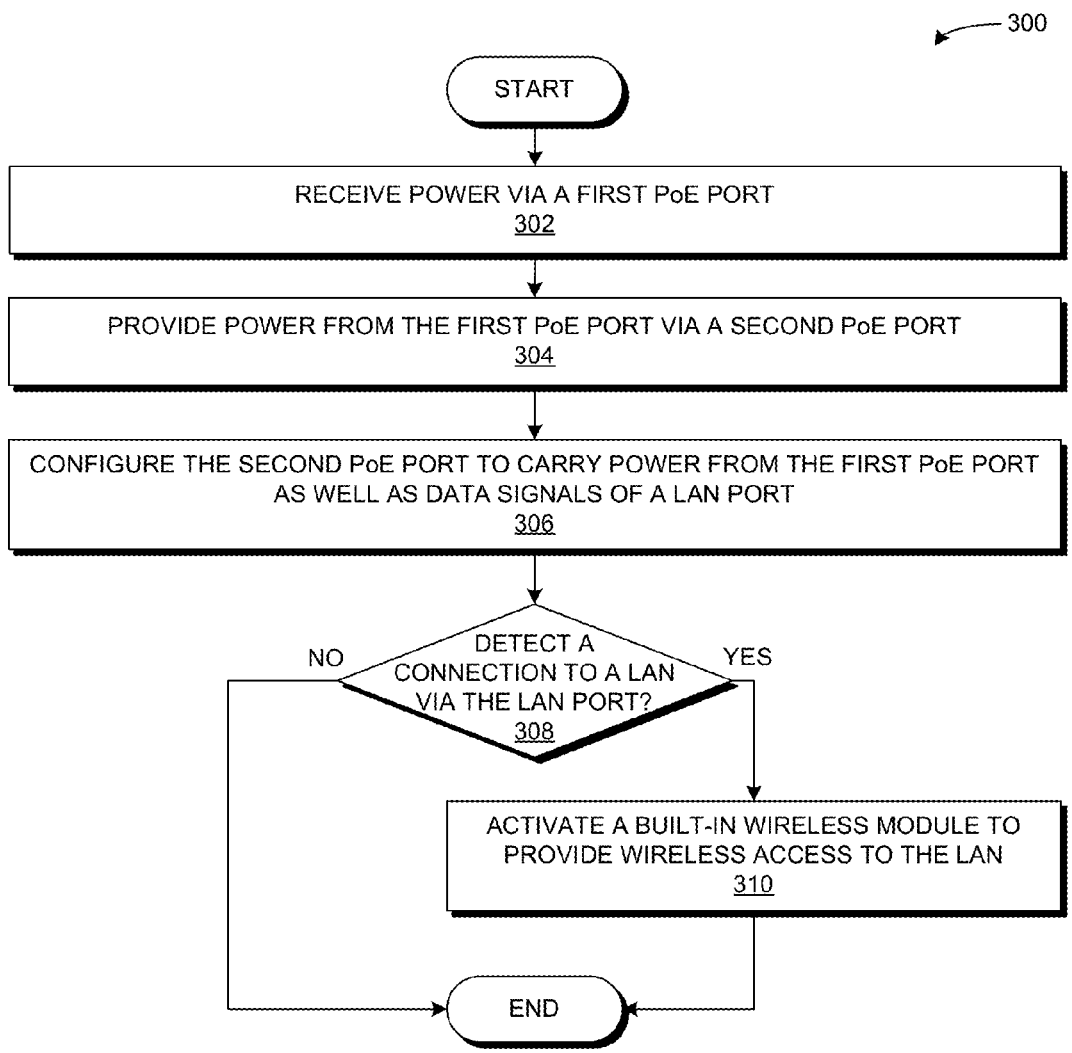
FIG. 3 presents a flow chart illustrating a method to configure the wireless AP to provide access to a local area network (LAN) via a wireless channel and a PoE output port in accordance with an embodiment.

FIG. 3 presents a flow chart illustrating a method 300 to configure the wireless AP device to provide access to a local area network (LAN) via a wireless channel and a PoE output port in accordance with an embodiment. During operation, when the wireless AP device receives power via a first PoE port, the device configures a second PoE port to provide power from the first PoE port (operation 304). This configuration allows the user to connect any device that requires power from an Ethernet port to the second PoE port.

In some embodiments, the user can configure the wireless AP device to inject power into an Ethernet connection. For example, the user may plug an Ethernet cable from a network router or switch into the wireless AP device's LAN port as a way to inject power into the Ethernet connection. With this configuration, the device configures the second PoE port to also carry data signals of the device's LAN port (operation 306). If the LAN port is not connected to a network device, or the network device is not communicating data, then the second PoE port will operate as a power source without providing a network connection.

The device also determines whether it detects a connection to a LAN via the device's LAN port (operation 308). If so, the device activates a built-in wireless module to provide wireless access to the LAN (operation 310).

Remote Device-Reset Via PoE-Enabled AP:

In some embodiments, a PoE injector or a PoE-enabled access point (AP) can include an external-reset button that facilitates remotely resetting a network device to a factory-default setting, without requiring physical access to the network device. For example, the network device can receive a network connection via an Ethernet cable coupled to the PoE injector or PoE-enabled AP. When a user presses the external-reset button, the PoE injector or PoE-enabled AP can generate and transmit a reset signal to the network device via the Ethernet cable. This way, the user can place the PoE injector and/or the PoE-enabled AP at an easy-to-reach location, and can reset the network device regardless of its location.

Figure 4:
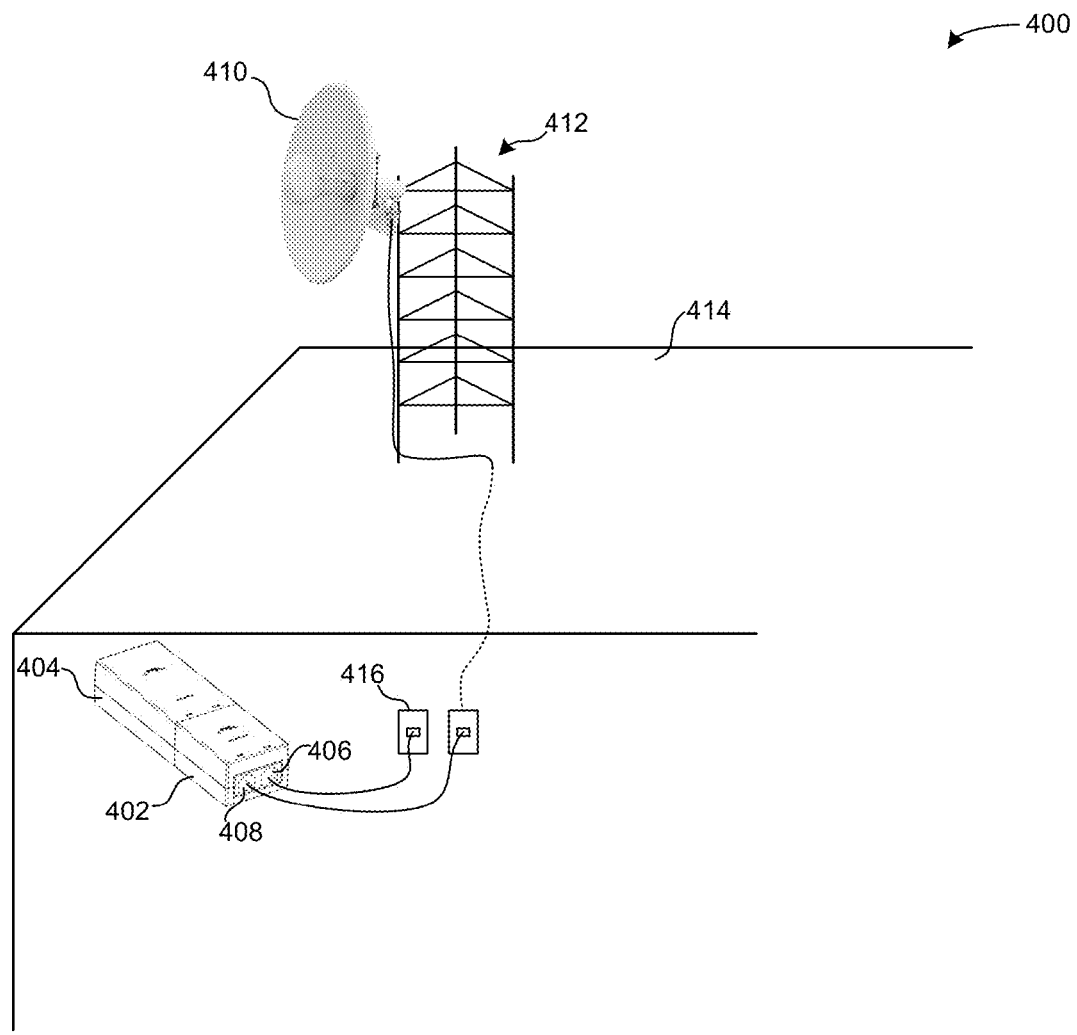
FIG. 4 illustrates an exemplary system that includes a PoE-enabled AP which transmits an external-reset signal for a remote network antenna in accordance with an embodiment.

FIG. 4 illustrates an exemplary system 400 that includes a PoE-enabled AP 402 which transmits an external-reset signal for a remote network antenna 410 in accordance with an embodiment. In system 400, PoE-enabled AP 402 can receive power from a PoE injector 404, and a network connection from a LAN port 416 (e.g., a wall Ethernet port providing access to a LAN). PoE-enabled AP 402 can also provide power and a network connection to a remote network device, via an Ethernet cable coupled to PoE port 408 of PoE-enabled AP 402. The remote device can include, for example, network antenna 410 that integrates a radio system within a feedhorn of antenna 410, and that may be installed at a location that is not easily accessible, such as on a radio tower 412 on top of a building 414.

As with many electronic systems, it occasionally becomes necessary to reset the radio system of antenna 410 to a factory-default setting. Typical radio systems oftentimes require the user to manually reset the system's circuit by holding down a reset button on the radio's circuits. However, because the radio system is embedded in antenna 410, it may become difficult and costly to reset the radio system by pressing a reset button mounted on antenna 410. A specially trained technician is oftentimes hired to climb up antenna tower 412 to service the radio system.

In some embodiments, PoE-enabled AP 402 can include two reset buttons: a local-reset button; and external-reset button. A user can reset network antenna 410 to a factory-default setting, without resetting PoE-enabled wireless AP 200, by the pressing external-reset button on PoE-enabled AP 402 for a predetermined period of time (e.g., 8 seconds). While the user presses and holds the external-reset button, PoE-enabled AP 402 generates and transmits the reset signal to antenna 410 via pin 3 of PoE port 408. Antenna 410 can detect the reset signal received via Ethernet pin 3, for example, while running a boot loader, at which point antenna 410 reconfigures itself to factory-default settings and boots from these factory-default settings.

Recall that PoE-enabled AP 402 also includes a wireless radio, which provides wireless network access to one or more Wi-Fi-enabled network devices. The user can reset PoE-enabled AP 402 to factory-default settings, without resetting antenna 410, by pressing the local-reset button for a predetermined period of time (e.g., 8 seconds). In some configurations, PoE-enabled AP 402 can also be installed in a difficult-to-reach location, such as on top of a bookshelf to provide optimal Wi-Fi coverage, and receives power and/or a network connection from PoE injector 404 via a LAN-in port 406 (configuration not shown). The user can reset the PoE-enabled AP 402 by pressing the external-reset button on PoE injector 404 for the predetermined period of time. PoE-enabled AP 402 can detect the reset signal received via pin 3 of LAN-in port 406, at which point PoE-enabled AP 402 can reconfigure itself to factory-default settings, and reboots to these factory-default settings.

Figure 5A:
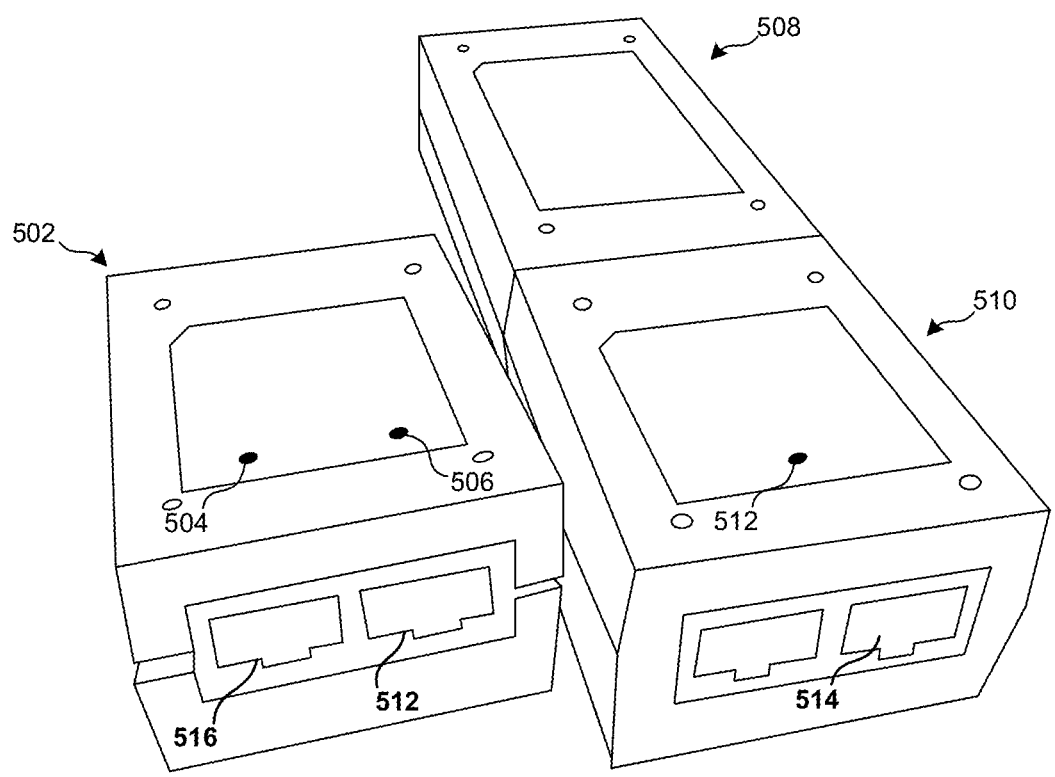
FIG. 5A presents a picture illustrating a chassis, for a PoE-enabled AP, which includes a local-reset button and an external-reset button in accordance with an embodiment.

FIG. 5A presents a picture 500 illustrating a chassis, for a PoE-enabled AP 502, which includes a local-reset button and an external-reset button in accordance with an embodiment. Specifically, picture 500 illustrates a chassis bottom of PoE-enabled AP 502, as well as a chassis bottom of a PoE injector 508 coupled to a PoE-enabled AP 510.

Some PoE-enabled AP devices can receive power from a power injector 508, and can provide power to a remote network device via a PoE port. For example, PoE-enabled AP 510 can be coupled to PoE injector 508 to receive power via an Ethernet port (not shown), and to provide power and a network connection to the remote device via PoE port 514. PoE-enabled AP 510 can also include a reset button 512, which causes AP 510 to reconfigure itself to factory-default settings, and load from these factory-default settings.

Some other PoE-enabled APs, such as AP 502, can also include an external-reset button 506 in addition to a local-reset button 504. When local-reset button 504 is pressed for at least a predetermined time interval, reset button 504 generates a reset signal that causes PoE-enabled AP to reset to factory-default settings. On the other hand, when external-reset button 506 is pressed for a predetermined time interval, external-reset button 506 generates and transmits a reset signal via pin 3 of a PoE port 512. A remote network device that receives a network connection via PoE port 512 can reset itself to factory-default settings when the device detects the external-reset signal via the PoE network connection.

Figure 5B:
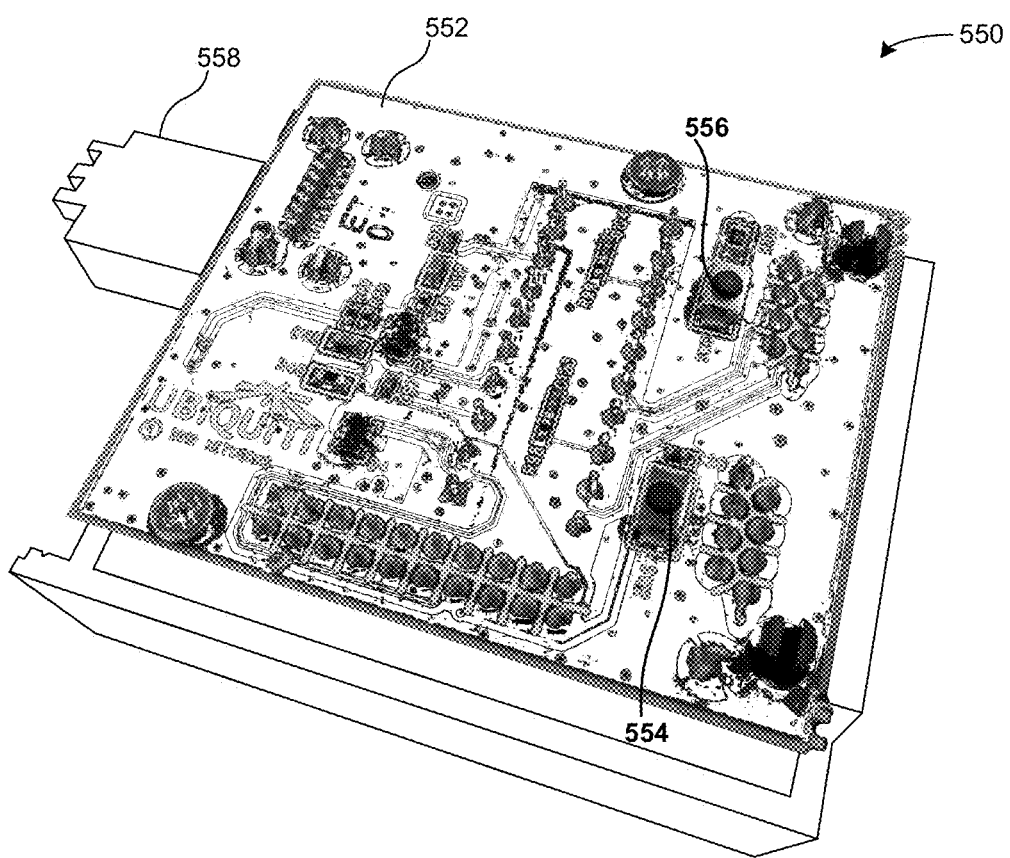
FIG. 5B illustrates a circuit board for a PoE-enabled AP in accordance with an embodiment.

FIG. 5B illustrates a circuit board 552 for a PoE-enabled AP 550 in accordance with an embodiment. Specifically, circuit board 552 includes a local-reset button 554 and an external-reset button 556. The chassis for PoE-enabled AP 550 includes pinholes which provide access for pressing local-reset button 554 and/or external-reset button 556 using a thin device (e.g., a pin, a needle, a pen, etc.). FIG. 5B also illustrates a PoE-input port 558 for PoE-enabled AP 550, which can be coupled to a PoE-injector to receive power for circuit board 552. The power received via PoE-input port 558 can also be used to provide power to a remote network device via a PoE-output port (e.g., port 512 of FIG. 5A).

Figure 6:
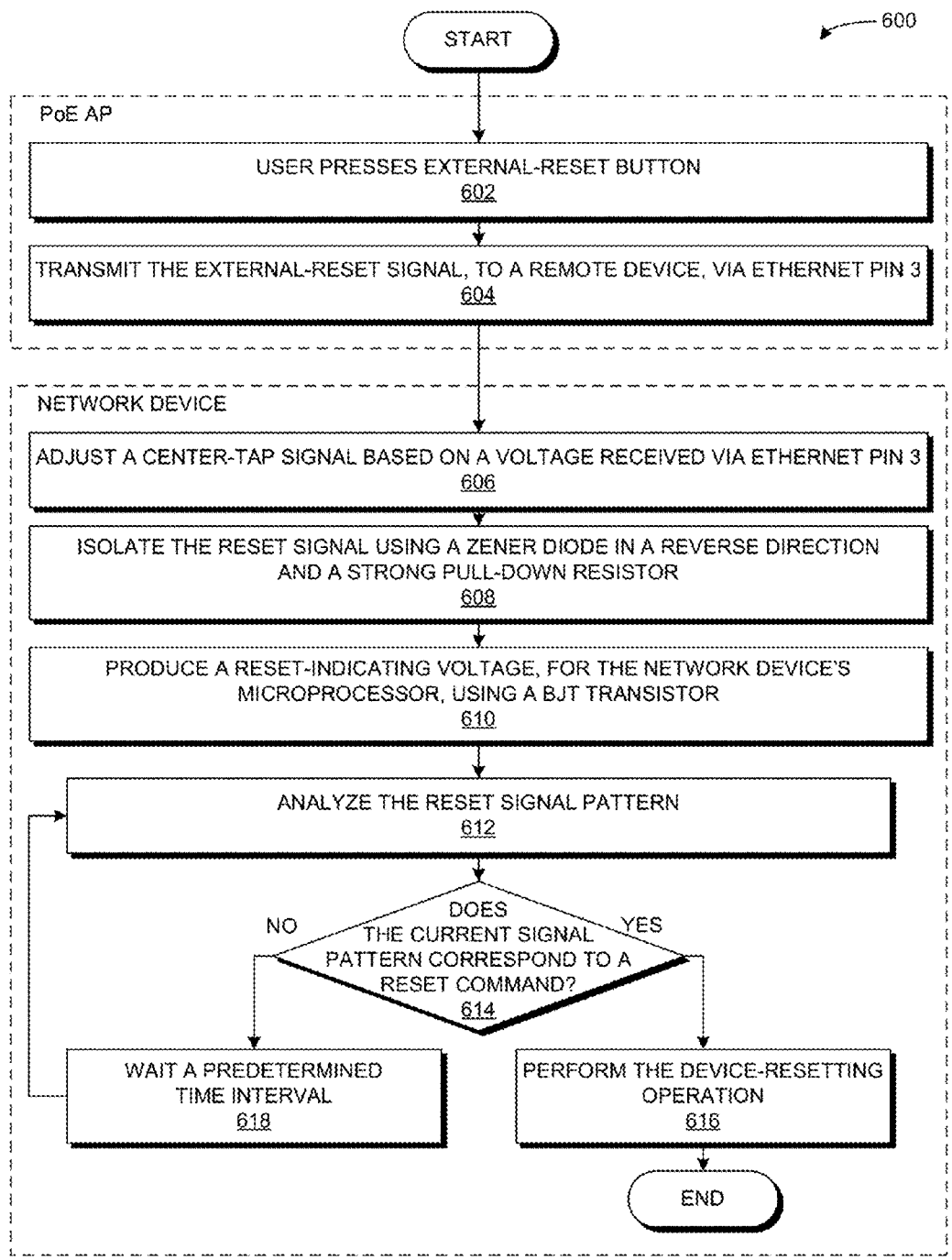
FIG. 6 presents a flow chart illustrating a method for resetting a remote network device, to a factory-default setting, remotely from a PoE-enabled AP in accordance with an embodiment.

FIG. 6 presents a flow chart illustrating a method 600 for remotely resetting a remote network device to factory-default settings, from a PoE-enabled AP in accordance with an embodiment. During operation, a user can reset a network device remotely by pressing an external-reset button of a PoE-enabled AP (operation 602). The PoE-enabled AP then transmits an external-reset signal to a remote network device via pin 3 of a PoE connection (operation 604).

At the other end of the PoE network connection, the remote network device can use a transformer to adjust a center-tap signal based on a voltage received via Ethernet pin 3 (operation 606). The center-tap signal's voltage can vary based on voltage changes in the Ethernet pins, such as a large voltage from an external-reset signal over pin 3, or small voltage changes from data transmitted over the Ethernet cable or electromagnetic interference captured by the Ethernet cable. Hence, the network device can use a Zener diode (in a reverse direction), and a strong pull-down resistor, to isolate the reset signal from the center-tap signal (operation 608). The Zener diode and the strong pull-down resistor can remove small floating voltages from the center-tap signal by allowing voltages above a given threshold (e.g., 5.1 V) to flow through to the Zener diode's anode.

The network device then uses a bipolar junction transistor (BJT) to produce a reset-indicating voltage from the reset signal (operation 610). The network device's microprocessor receives the reset-indicating voltage via a general-purpose input-output (GPIO) pin, analyzes the reset signal pattern (operation 612), and determines whether the reset signal pattern corresponds to a reset command (operation 614). If so, the network device performs the device-resetting operation (operation 616).

However, if the signal pattern does not correspond to a reset command (e.g., the reset signal has occurred for less than a predetermined interval), the system can wait for a predetermined wait-time interval (operation 616), and returns to operation 612 to analyze the reset signal pattern.

Figure 7A:
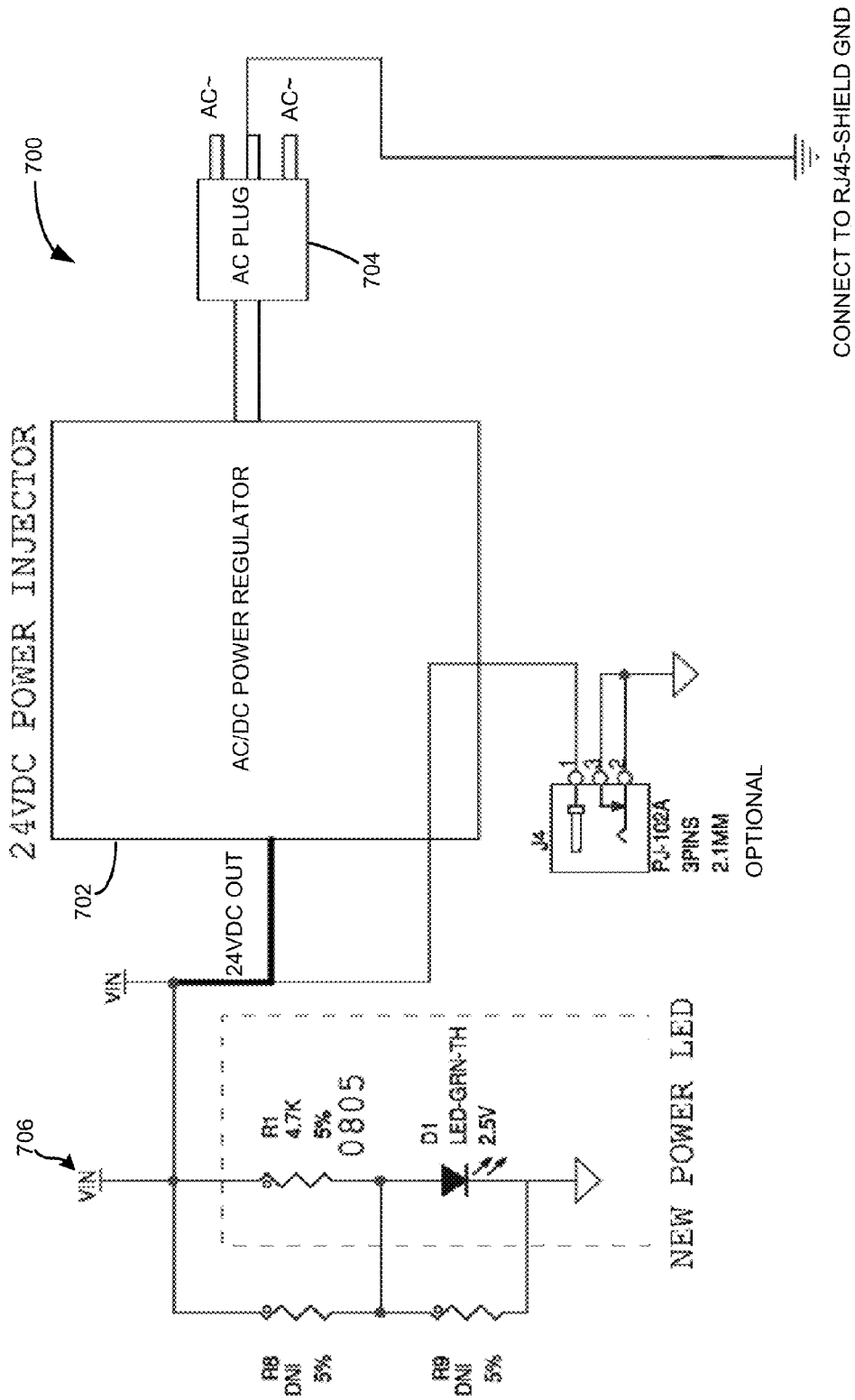
FIG. 7A illustrates an exemplary power circuit of a PoE injector for injecting a direct-current (DC) power supply to an Ethernet cable in accordance with an embodiment.

FIG. 7A illustrates an exemplary power circuit 700 of a PoE injector for injecting a direct-current (DC) power supply to an Ethernet cable in accordance with an embodiment. Power circuit 700 includes an AC plug 704 for receiving an alternating current (AC) power supply from an AC outlet, and includes a power injector circuit 702 for generating a voltage source 706 (e.g., a direct current (DC) power supply) from the AC power supply.

Figure 7B:
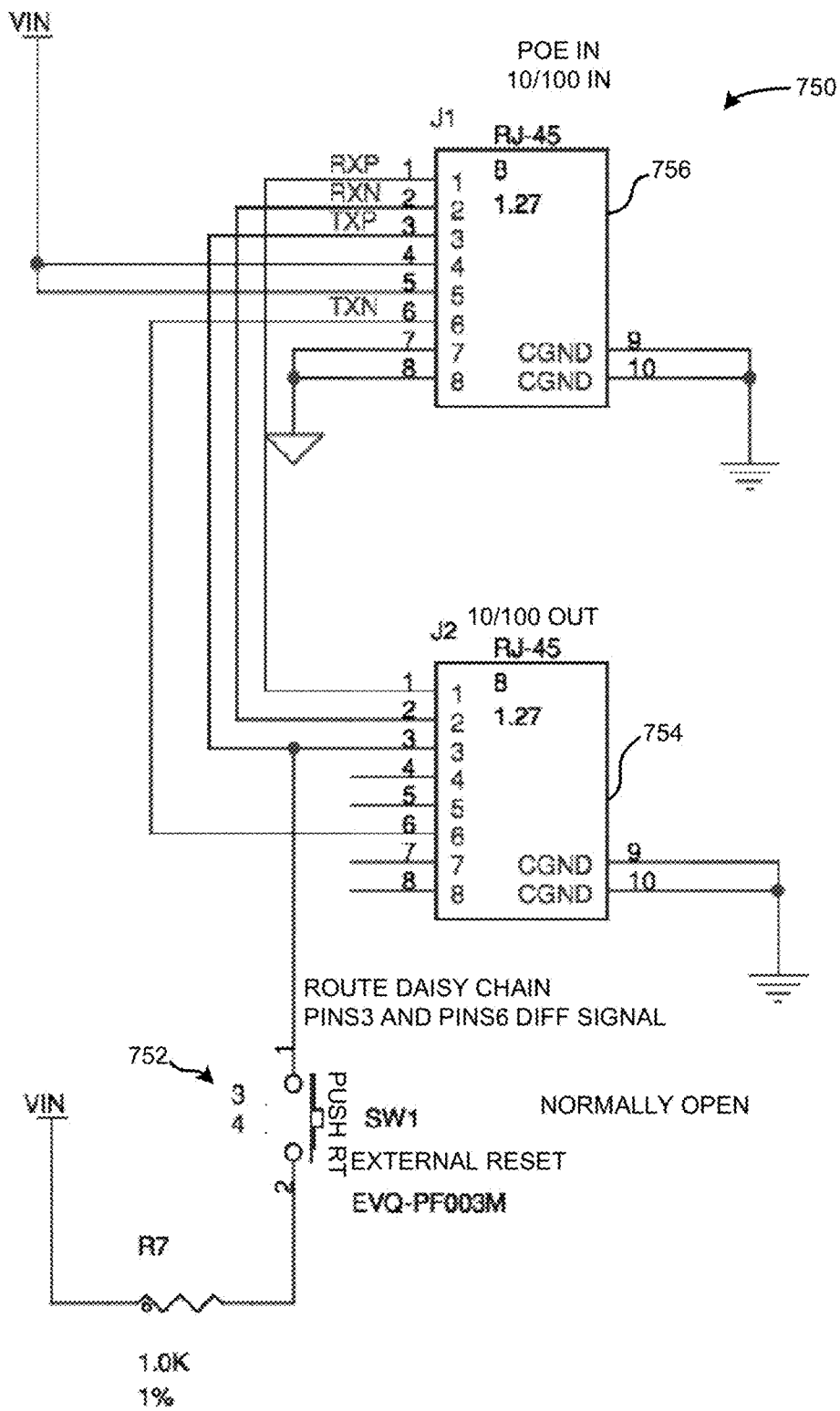
FIG. 7B illustrates an exemplary reset button for resetting a network device, to a factory-default setting, remotely via the Ethernet cable in accordance with an embodiment.

FIG. 7B illustrates an exemplary external-reset circuit 752 for remotely resetting a network device to factory-default settings via the Ethernet cable in accordance with an embodiment. For example, external-reset circuit 752 can be included within a PoE injector (e.g., PoE injector 508 of FIG. 5)), or within a PoE-enabled access point (e.g., PoE-enabled AP 502 of FIG. 5), to facilitate resetting a remote network device to factory-default settings over a LAN cable.

Recall that a PoE source can include a LAN connector circuit 750, which couples the data pins from a LAN-in port 758 to a LAN-out port 756. LAN connector circuit 750 of a PoE source can also include an external-reset circuit 752 to reset a remote network device to factory-default settings via LAN-out port 756, such as a wireless access point or antenna/radio system that has been installed at an out-of-reach location.

In some embodiments, external-reset button 754 is normally open. When external-reset button 754 is pressed, external-reset button 754 provides a high current and/or high voltage signal to pin 3 of a LAN-out port 756 (e.g., port 262 of PoE source 250). External-reset button 754 sources the high current and/or voltage from voltage source 706 (labeled $V_{IN}$), which is generated by power injector circuit 702 of FIG. 7A. Hence, when external-reset button 754 is pressed, a remote network device that receives a network connection via LAN-out port 756 can also detect the reset signal, at which point the remote network device can reconfigure itself to factory-default setting, and boots from these factory-default settings.

In some embodiments, external-reset circuit 752 can also receive the reset signal from pin 3 of LAN-in port 758. This is because a LAN connector circuit 750 of a PoE source couples the data pins from a LAN-in port 758 to a LAN-out port 756, and because these data pins include pin 3 that is used to carry the external-reset signal. This configuration allows a network device that provides network access for a PoE injector via LAN-in port 758 to send a reset signal to a remote network device coupled to LAN-out port 756.

When a PoE-enabled wireless AP includes external-reset circuit 752, a user can use external-reset button 754 to reset a remote network device over a LAN cable. The wireless AP can receive power from a PoE injector via a PoE-only port (e.g., via PoE port 512 of FIG. 5A), and can generate an external-reset signal for a remote network device coupled to LAN-out port 756. For example, a PoE-enabled wireless AP can include two reset buttons: a local-reset button (not shown); and external-reset button 752. A user can reset the remote network device to factory-default settings, without resetting PoE-enabled wireless AP 200, by pressing external-reset button 754 for a predetermined period of time (e.g., 8 seconds). PoE-enabled wireless AP 200 transmits the reset signal via pin 3 of LAN-out port 752.

Also, the user can reset the local PoE-enabled wireless AP to factory-default settings, without resetting the remote network device, by pressing the local-reset button for a predetermined period of time (e.g., 8 seconds). Alternatively, if the PoE-enabled wireless AP is receiving power and/or a network connection via a LAN-in port 756, the user can reset the PoE-enabled wireless AP by pressing the external-reset button on the PoE source for the predetermined period of time. The PoE-enabled wireless AP can detect the reset signal received via pin 3 of the LAN-in port, at which point the wireless AP reconfigures itself to factory-default settings, and boots from these factory-default settings.

The remote network device and/or the wireless AP can include a reset-signal detector, which isolates a reset signal received via Ethernet pin 3. The reset-signal detector provides the reset signal to the device's microprocessor via a GPIO port, which causes the device to reset itself to factory-default settings.

Figure 8A:
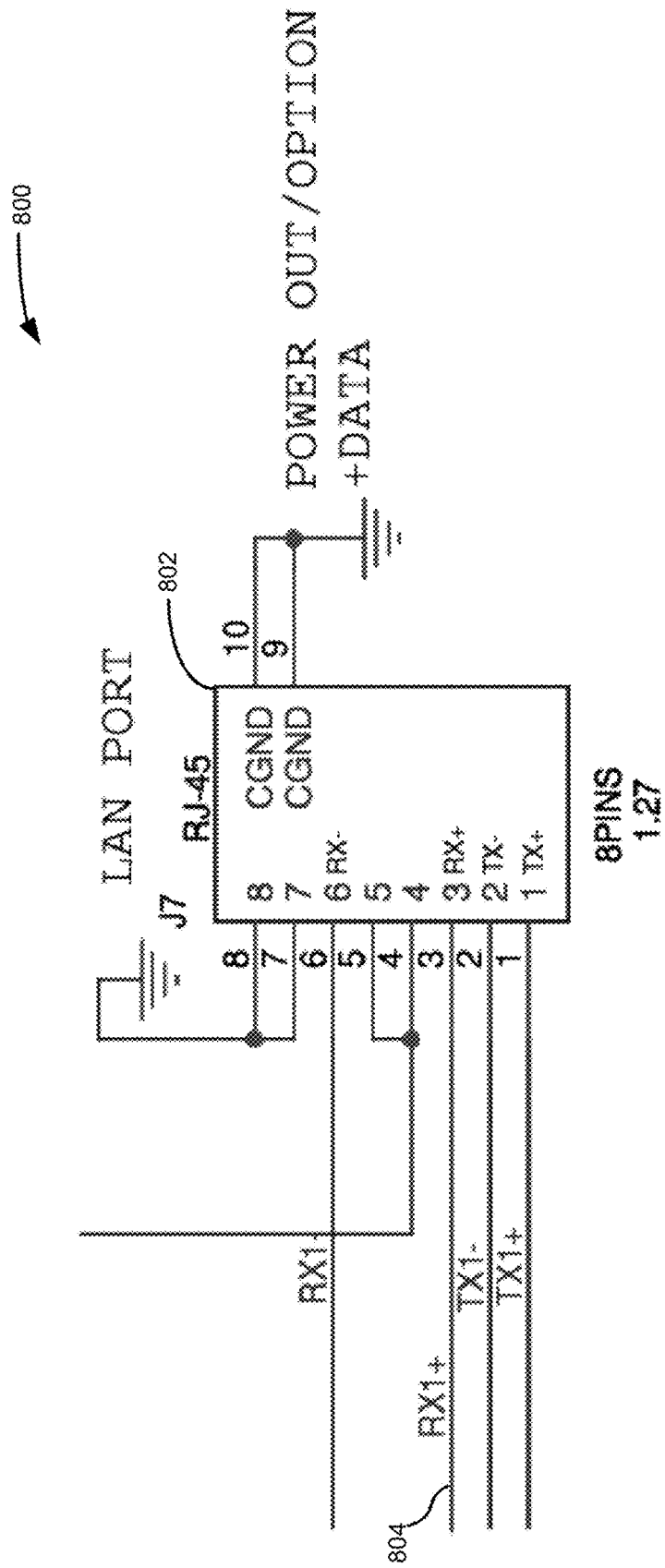
FIG. 8A illustrates a LAN port for a network device in accordance with an embodiment.

FIG. 8A illustrates a LAN port 802 for a network device that detects a remote-reset signal in accordance with an embodiment. LAN port 802 can provide a PoE power source via pins 4 and 5, and can provide a PoE ground connection via pins 7 and 8. LAN port 802 can transmit data via a differential signal pair on pins 1 and 2, and can receive data via a differential signal pair on pins 3 and 6. Specifically, the network device can detect an external-reset signal received via a data signal 804 coupled to pin 3 of LAN port 802 (e.g., pin RX+).

Figure 8B:
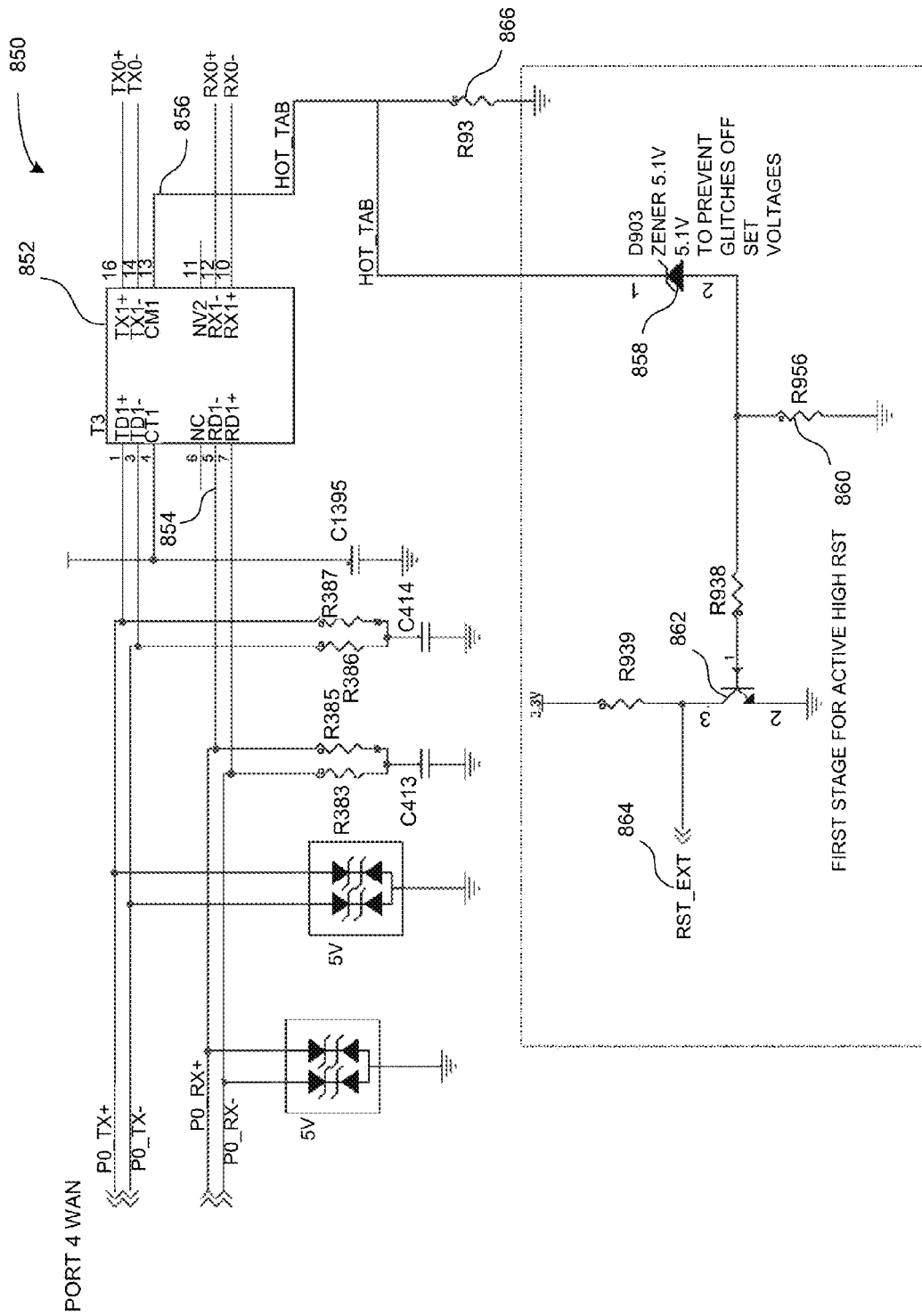
FIG. 8B illustrates a reset-signal detector for detecting a remote device-reset signal from a remote device via an Ethernet cable in accordance with an embodiment.

FIG. 8B illustrates an external-reset signal detector 850 for detecting an external-reset signal from a remote device via an Ethernet port in accordance with an embodiment. External-reset signal detector 850 can include a transformer 852 that isolates data signals (received via LAN port 802) from noise picked up by the Ethernet cable. Transformer 852 provides access to the isolated receiving (RX) and transmission (TX) data signals via pins 10, 12, 14, and 16. Transformer 852 also provides access to the DC voltage and/or current isolated from the data signals via the center-tap signal 856 (e.g., via pin labeled CM1). Hence, a change in DC voltage and/or current via data signal 854 (which is coupled to data signal 804 of FIG. 8A) results in a substantially similar change in DC voltage and/or current via center-tap signal 856.

In some embodiments, external-reset signal detector 850 can isolate an external-reset signal from center-tap signal 856. External-reset signal detector 750 can include a strong pull-down resistor 866 coupled to center-tap signal 856, and a Zener diode 858 in the reverse direction whose cathode is coupled to center-tap signal 856. Pull-down resistor 856 can dampen glitches in center-tap signal 856, and Zener diode 858 can remove small floating voltages from center-tap signal 856 by allowing voltages above a given threshold (e.g., 5.1 V) to flow through to the anode. Note that the Ethernet data pins (e.g., pin 3) carry data via a weak electric current. Hence, pull-down resistor 866 can dampen (reduce) the weak currents that carry Ethernet data, and Zener diode 858 only allows the high-voltage that carries a reset signal to flow through to the anode.

The anode of Zener diode 858 is coupled to a pull-down resistor 860 that dampens glitches in the signal, and is also coupled to a transistor 862 (e.g., an NPN-type Bipolar Junction Transistor, or BJT). Hence, when center-tap signal 856 includes a sufficiently large current or voltage to pass through Zener diode 858 (e.g., producing a voltage of at least 5.1 V at the cathode of Zener diode 858), the voltage at the anode of Zener diode 858 can activate transistor 862, which in turn produces a reset-indicating voltage at reset-signal 864.

During operation, it is possible that reset-signal 864 can carry some electrical glitches that are not intended reset signals. In some embodiments, the network device can poll reset-signal 864 periodically to determine whether reset-signal 864 is transmitting a signal pattern associated with a predetermined reset operation. For example, the device may determine whether reset-signal 864 is transmitting a device-reset signal that includes a single pulse whose duration is at least equal to a predetermined period (e.g., 8 seconds). When the network device detects such a device-reset signal, the network device can respond by reconfigures itself to factory-default settings, and entering a reboot cycle to loads from these factory-default settings.

As another example, the device may determine whether reset-signal 864 is transmitting a firmware-reset signal that includes a first pulse signal with a first time period (e.g., 2 seconds), followed by a second pulse signal with a second time period (e.g., 1 second), followed by a third pulse signal with a third time period (e.g., 2 seconds). When the network device detects a firmware-reset signal, the device can respond by loading a previous firmware version from storage, such as a firmware version known to be stable, and performing a reboot cycle to boot from the previous firmware version.

External Reset from a Gigabit Network Router or Switch

Figure 9A:
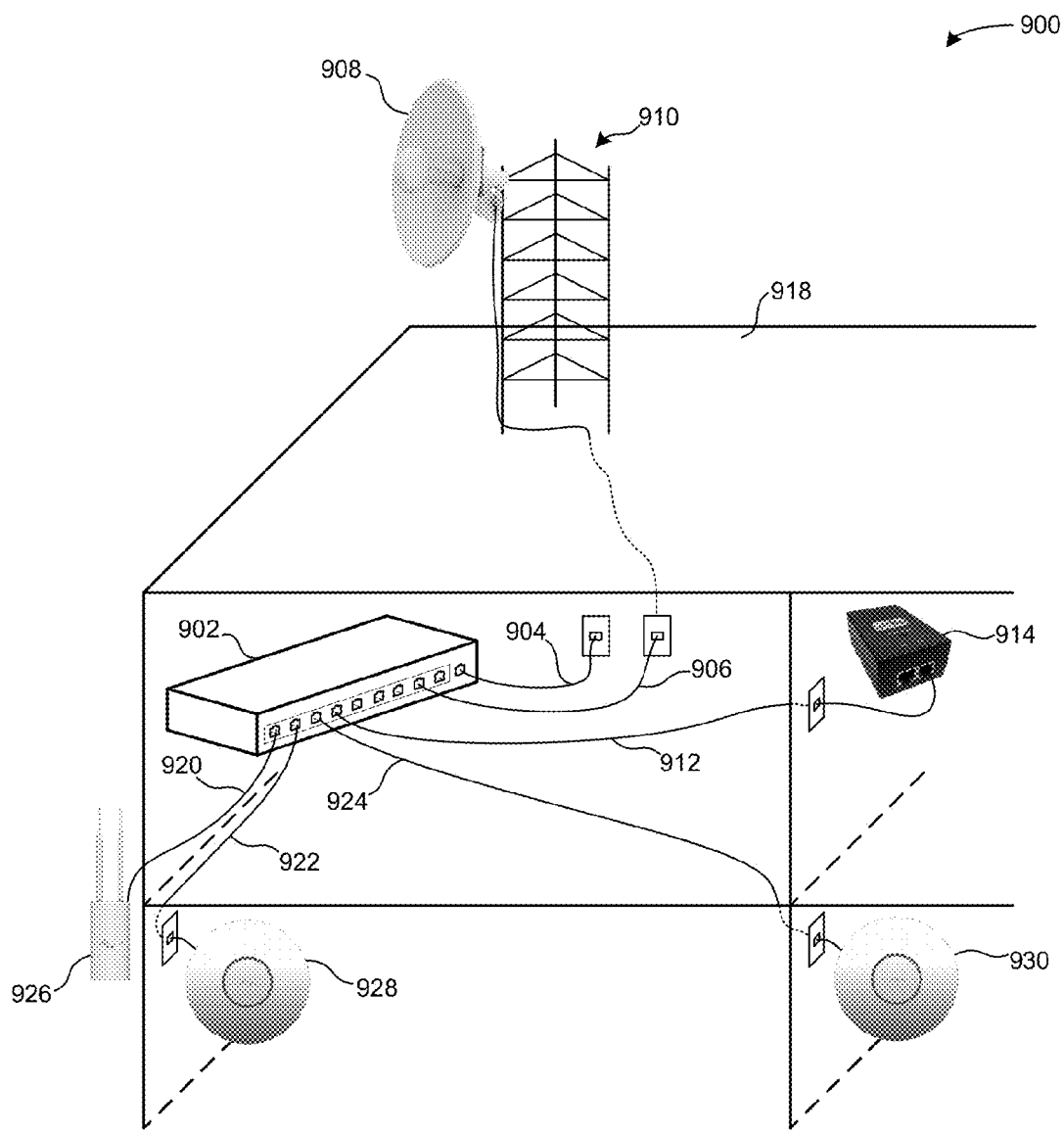
FIG. 9A illustrates an exemplary system that includes a PoE-enabled network router or switch which transmits an external-reset signal for a remote network device in accordance with an embodiment.

FIG. 9A illustrates an exemplary system 900 that includes a PoE-enabled network router or switch 902 which transmits an external-reset signal for a remote network device in accordance with an embodiment. Herein after, the term "switch" generally refers to a network router or a network switch.

PoE-enabled network switch 902 can provide power and a network connection to a plurality of network devices via Ethernet cables. For example, network switch 902 may provide 48 V of DC voltage and a Gigabit network connection to a network antenna 908 and/or a PoE-enabled wireless AP 914, via an Ethernet cable 906 or 912, respectively. Network switch 902 can also provide network access to a set of wireless access points distributed throughout a physical region, such as an outdoor wireless AP 926 via an Ethernet cable 920, as well as indoor wireless APs 928 and 930 via Ethernet cables 922 and 924, respectively.

Recall that it may occasionally become necessary to reset a network device to factory-default settings (or to previous firmware settings), which can be difficult and costly if the network device is installed at a location that is not easily accessible, such as on a radio tower 910 on a building rooftop 918 or attached to a ceiling within a building. If it becomes necessary to reset a collection of wireless APs, it can be time consuming to physically visit each wireless AP within a physical space to manually reset these APs, such as outdoor AP 926 that may be attached to an outside wall of a building, or wireless APs 914, 928, and 930 that may be fastened to ceilings across various rooms throughout the building. Network switch 902 can include an internal circuit for sending an external-command signal pattern to a network device coupled to a specific Ethernet port of network switch 902. The external-command signal may correspond to a device-reset command, a firmware-upgrade command, a firmware-downgrade command, or any other device-configuring command now known or later developed.

In some embodiments, network switch 902 can determine which network devices can detect an external-command signal via a DC-voltage bias over an Ethernet connection. For example, network switch 902 and a network device (e.g., antenna device 908 or wireless AP 914) can determine each other's capabilities using data packets (e.g., using a Lightweight Directory Access Protocol, or LDAP). If network switch 902 determines that a given network device can detect an external-command signal, network switch 902 can transmit an external-command signal to the network device over an Ethernet connection to the network device. Also, if the network device determines that network switch 902 can transmit external-command signals, the network device can activate circuits and/or software modules that detect and process external-command signals from a DC-voltage bias received over the Ethernet connection.

Network switch 902 can generate the external-command signal in response to a user pressing a button next to an Ethernet port of network switch 902 (e.g., pressing an external-reset button for the network device). Alternatively, network switch 902 can generate the external-command signal in response to receiving a reset command from a remote computing device via a computer network, or in response to detecting a set of predetermined conditions have been satisfied. For example, a user can access a device-controlling interface, either from an application installed in the user's local computer, or via a Web interface hosted by network switch 902 or a remote server (e.g., a Web-based application running on a server cluster). The device-controlling interface can provide the user with status information for a plurality of network devices coupled to network switch 902 and/or other network switches. The device-controlling interface can also provide the user with an ability to control or configure a set of network devices simultaneously. The user can interact with the device-controlling interface to reset one or more target network devices to factory-default settings, and the device-controlling interface configures network switch 902 to send an external-command signal pattern via the Ethernet ports coupled to the target devices.

When the user selects a button of the device-controlling interface to reset the network device, the device-controlling interface can inform the user that the command is being communicated to the network device by deactivating the reset button, and/or by presenting a wait-indicator for the duration of the external-command signal (e.g., 8 seconds). The device-controlling interface can present the "deactivated" reset button using a grey or dimmer version of the reset button, which cannot be selected or otherwise activated. The wait-indicator may include a row of rectangular indicators, which "light up" from left to right, for example, by changing from a first color or pattern to a second color or pattern. Once the external-command signal has been communicated to the network device, the device-controlling interface can indicate this by reactivating the reset button, and/or by changing the reset button's color (e.g., to green) or presenting the reset button so that it appears to glow.

In some embodiments, the device-controlling interface can perform advanced device-controlling operations. For example, the user can interact with the device-controlling interface to install a firmware upgrade simultaneously on a plurality of target devices that the user has selected. The device-controlling interface then automatically installs the firmware upgrade on the selected devices, for example, by uploading the firmware to the selected devices, and by sending a device-reset signal to the devices after the firmware has been uploaded.

PoE-enabled network switch 902 can send a variety of external-command signal types. Each type of reset signal has a corresponding signal pattern, which the network devices can distinguish between the different signal patterns by polling the reset signal at a sufficiently fast rate. For example, after the user installs the firmware upgrade on the set of devices, if the firmware does not run properly on these devices, the user can interact with the device-controlling interface to revert the firmware on these devices to a previous firmware version known to work properly. In response to this request, the device-controlling interface configures network switch 902 to send an external signal pattern which configures the network device to revert to a previously installed firmware version, and to reboot to this previous version. This signal pattern can include, for example, at least two consecutive pulses that repeat a two-second high-voltage signal followed by a one-second pause.

As another example, the user can interact with the device-controlling interface to reboot the network device into a universal boot loader (U-boot) mode by sending a corresponding external-command signal pattern. When the network device receives this signal pattern (e.g., while running a boot loader), the network device boots into a minimal-functionality state, such as by not loading an operating system kernel image, or by loading a safe-mode kernel image. The user may need to place the network device into U-boot mode, for example, to install a firmware image when the network device's firmware image becomes corrupt (e.g., when upgrading the firmware image, or during runtime). Once the network device is in U-boot mode, the user can proceed to perform a clean install of the desired firmware image.

The user can also interact with the device-controlling interface to define a set of rules for automatically controlling the network devices. For example, a rule can indicate that network switch 902 is to send an external-command signal pattern to a given network device if the network device goes offline (e.g., becomes inoperable) for at least a predetermined amount of time (e.g., 10 minutes). The user can configure a "port watchdog" to periodically ping the network devices. If a network device stops responding, the network switch can force a reboot operation of the remote device by temporarily turning off PoE power to the network device. If the network device is still not responding or operating correctly after the reboot cycle, the network switch can again force a reboot operation on the network device, as well as send a device-reset or a firmware-reset command to the network device while the device is running the boot loader.

In some embodiments, network switch 902 sends the external-command signal pattern to a network device by sending a DC level bias over pin pairs (4,5) (7,8) of the Gigabit Ethernet port. For example, the switch can send a logic '1' signal by transmitting 0V DC or 24V DC over pins 4 and 5 of the Gigabit Ethernet port, and sending 48V DC over pins 7 and 8 of the Gigabit Ethernet port. This difference in voltage across pin pairs (4,5) and (7,8) creates a voltage bias that can be detected by the network device at the other end of the Gigabit Ethernet connection. Also, to transmit a logic '0' signal, network switch 902 can transmit the same DC voltage (e.g., 48V, or 24V) over both pin pairs (4,5) and (7,8). The network device at the other end of the Gigabit Ethernet connection detects this as a 0V DC bias.

Figure 9B:
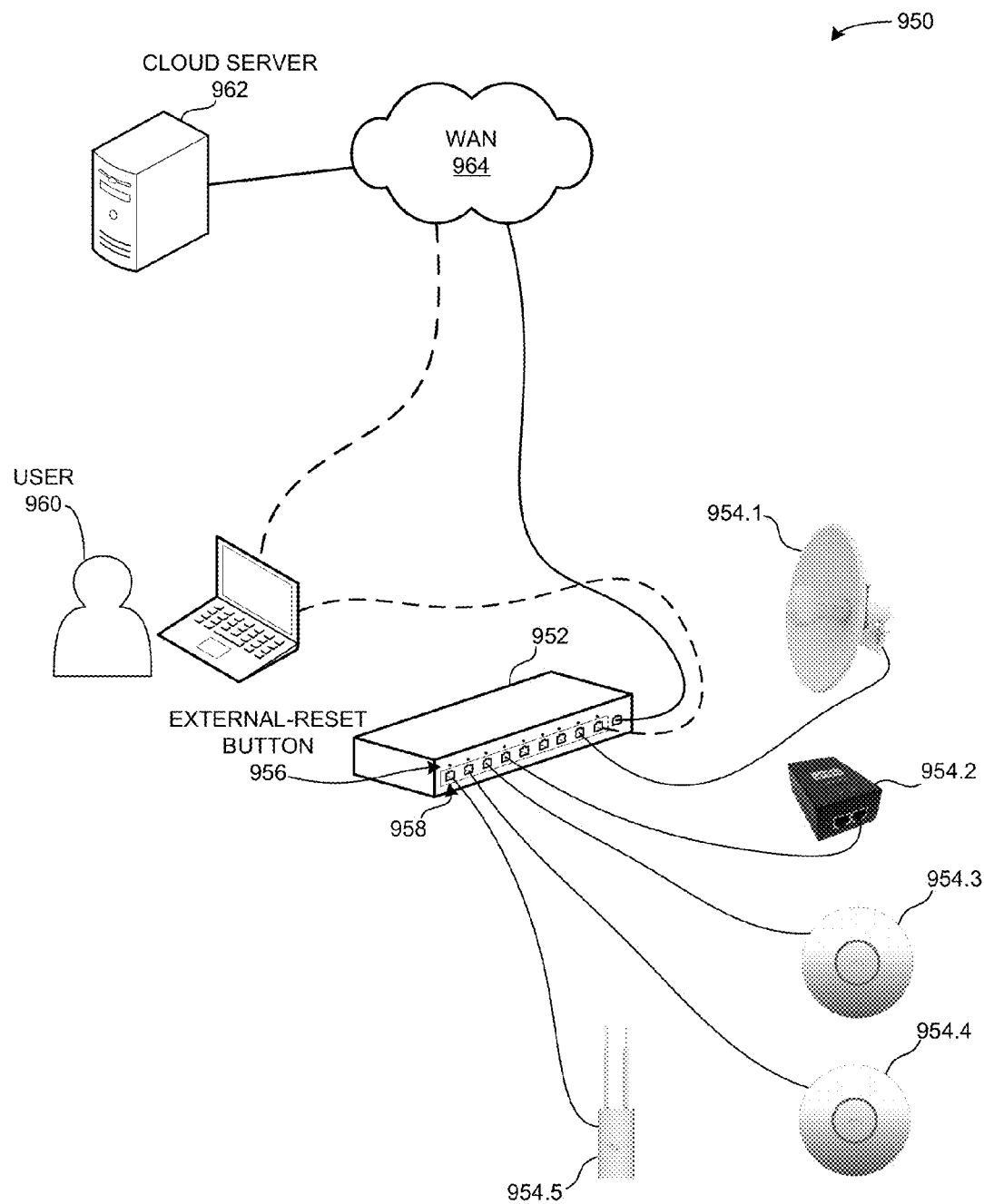
FIG. 9B illustrates an exemplary system that includes a PoE-enabled network router or switch, which can receive instructions from a remote computing device, for transmitting an external-reset signal to a network-attached device in accordance with an embodiment.

FIG. 9B illustrates an exemplary system 950 that includes a PoE-enabled network switch 952, which can receive instructions from a remote computing device, for transmitting an external-reset signal to a network-attached device in accordance with an embodiment. Network switch 952 can include a plurality of PoE-enabled Ethernet ports (e.g., port 958), and each can provide a network connection as well as power to a remote network device via an Ethernet cable. For example, network switch 952 can provide a network connection and/or power to a network antenna 954.1, to a PoE-enabled wireless AP, and/or to a plurality of indoor and/or outdoor wireless APs 954.3, 954.4, and 954.5.

Network switch 952 can also include a plurality of external-reset buttons (e.g., external-reset button 956) for sending an external-reset signal to an attached network device via a corresponding Ethernet port. When a user presses and holds external-reset button 956 for at least a predetermined time interval (e.g., 8 seconds), network switch 952 generates and sends an external-reset command via Ethernet port 958. Recall that the remote network device may only detect the external-reset signal during a boot sequence (e.g., while running a bootloader to load a firmware image). Hence, in some embodiments, when the user presses and holds the external-reset button, network switch 952 can respond by first rebooting the remote network device (e.g., by not supplying power to the remote device via Ethernet port 958 for a predetermined time interval). Network switch 952 can then generate and transmit the external-reset signal to the remote device while the remote device is running the bootloader.

Further, network switch 952 can also include a local "master" reset button (not shown), which can reset network switch 952 and devices 954 to a default configuration. Note that because pressing the master reset button makes significant configuration changes to a plurality of different devices, the master reset button may be placed on a safe location of network switch 952, such as on the back of network switch 952 or behind a hidden panel of network switch 952. When user 960 presses the master reset button for a predetermined time interval (e.g., 8 seconds), network switch 952 may reboot, and the bootloader of network switch 952 can revert network switch 952 to a default configuration (e.g., to a default factory-installed firmware image) The bootloader may also generate and transmit an external-command signal over all Ethernet ports to reconfigure any attached devices to a default configuration. Hence, pressing the master reset button on network switch 952 achieves a near-simultaneous reset of network switch 952 as well as devices 954 coupled to Ethernet ports of network switch 952.

In some other embodiments, network switch 952 can receive instructions from a user 960 (via the user's personal computing device) or from a cloud-based server computer 962, for sending an external-reset command to a remote network device. For example, user 960 can interact with a user interface (UI) that illustrates a status for a plurality of remote network devices coupled to network switch 952. If user 960 desires to reset one or more remote devices to default settings, user 960 can select a "reset" button next to each target device on the UI. Doing so causes network switch 952 to send an external-reset command to the corresponding remote device. Network switch 952 can generate and send this external-reset command using a signal pattern that is transmitted over a floating DC-level bias signal over Ethernet pins (4,5) and (7,8) of a corresponding Ethernet port (e.g., Ethernet port 958 for network device 954.5).

User 960 can also select checkboxes next to each of a plurality of network devices presented on the UI, and can select a "reset all" button. When the user selects the "reset all" button, network switch 952 responds by sending an external-reset command to each of the selected network devices via their corresponding Ethernet ports, thus performing a near-simultaneous reset of the plurality of network devices selected by user 960.

In some embodiments, the UI may be generated and hosted as a web page by network switch 952, and is provided to a personal computing device of user 960 using a hypertext transfer protocol (HTTP). If the user's personal computing device is coupled to network switch 952 via an Ethernet cable, network switch 952 can send the web UI to the personal computing device via this Ethernet connection. Otherwise, if the user's network device has a network connection to network switch 952 over a computer network (e.g., a local area network, or LAN 964), network switch 952 can send the web UI to the user's personal computing device over this computer network. Hence, when user 156 selects the "reset" button, the user's personal computing device can send commands via the HTTP session (e.g., using asynchronous requests) over the direct Ethernet connection or the computer network. These commands can configure network switch 958 to send an external-reset command to a remote network device, such as device 954.5 coupled to Ethernet port 958.

In some embodiments, the UI may be hosted by a cloud-based server computer 962 that issues command to network switch 952 via a wide area network 964. For example, when the user selects the "reset" button on the UI, the user's personal computing device can send the device-reset command to server 962 via the HTTP session, at which point server 962 sends the device-reset command to network switch 952 via data packets over WAN 964. When network switch 964 receives these data packets, network switch 964 generates and transmits the external-reset command to the remote network device, such as device 954.5 coupled to Ethernet port 958.

In some other embodiments, the UI may be provided by a local application running on a personal computing device. When user 960 selects the "reset" button, the user's personal computing device can send the device-reset command to network switch 952 via data packets transmitted over WAN 964 or over the direct Ethernet connection to network switch 952.

Figure 9C:
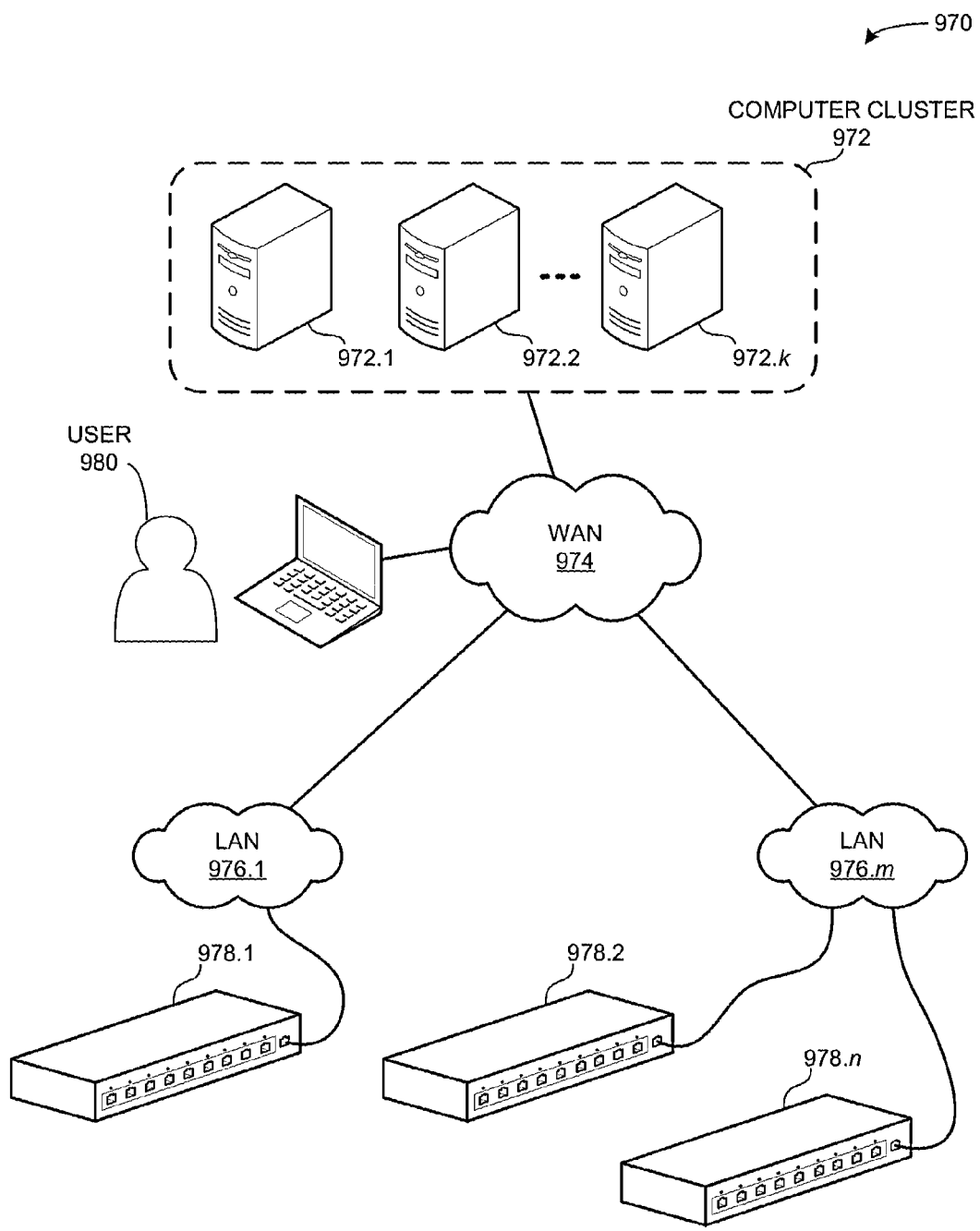
FIG. 9C illustrates an exemplary system that includes a central controller, on a computer cluster, which can send instructions to one or more PoE-enabled network router or switches of one or more network domains, for transmitting an external-reset signal to one or more network-attached devices in accordance with an embodiment.

FIG. 9C illustrates an exemplary system 970 that includes a central controller, operating on a computer cluster 972, which can send instructions to one or more PoE-enabled network switches 978 of one or more LAN domains 976, for transmitting an external-reset signal to one or more network-attached devices in accordance with an embodiment. During operation, computer cluster 972 can maintain a near-persistent network connection to a plurality of network switches 978. The controller running on computer cluster 972 can include a repository that stores configuration information for network switches 978, and for network devices coupled to Ethernet ports of network switches 978.

The controller can also use the repository to store current operating state and network-connectivity information for network switches 978 as well as for the network devices coupled to Ethernet ports of network switches 978. For example, a network switch can provide a network connection and/or power to a network antenna, to a PoE-enabled wireless AP, and/or to a plurality of indoor and/or outdoor wireless APs. The controller's repository can store the Media Access Control (MAC) address and/or any network address information for these devices, as well as configuration information and an operating state for these network devices.

Further, the controller can provide a web UI that facilitates a user 980 to monitor, control, and reconfigure network switches 978 and/or any devices coupled to Ethernet ports of network switches 978. Hence, user 980 can monitor and/or configure any network switch accessible by the controller, and/or any network device coupled to these network switches, regardless where these switches are located, and regardless of which LAN they are been deployed into.

The controller's UI can provide user 980 with a set of device-configuring capabilities, such as to reboot a device, to "reset" a device to a default configuration (e.g., a default firmware version), or to "revert" the firmware version to a previous firmware (e.g., on dual-firmware devices). When the user selects the "reset" button or the "revert" button on the UI, the user's personal computing device can send the device-reset command to the central controller on computer cluster 972 via the HTTP session, such as via an asynchronous response. The controller processes the HTTP message to identify one or more devices to reconfigure, to determine one or more network switches to which these devices are coupled, and to determine how to these devices are to be reconfigured.

The controller then sends the device-configuring command to the determined network switches via data packets over WAN 974. For example, if user 980 desires to reset network devices coupled to Ethernet ports on network switches 978.1 and 978.2, the controller can send device-configuring commands to network switch 978.1 via data packets over LAN 976.1, and can send device-configuring commands to network switch 978.2 via data packets over LAN 976.*m*. These device-configuring commands can identify a target network device using a unique identifier for the target device, such as the target device's MAC address.

When a network switch receives these data packets, the network switch identifies the target devices via their MAC address, and determines to which local Ethernet ports these devices are coupled. The network switch then generates and transmits the external-reset command to each of the remote network devices over their corresponding Ethernet port. In some embodiments, the network switch can perform a sequence of steps to transmit the device-configuring command using DC-level bias signals over the Ethernet port. For example, the network switch may first reboot the target remote device (e.g., by turning off power to the remote device via the Ethernet port). Then, the network switch may generate and transmit the external-reset signal to the remote device while the remote device is booting (e.g., while the device running a bootloader that monitors the Ethernet connection to detect DC-level bias signals over pins (4,5) and (7,8)). When the target device's bootloader detects and recognizes the external-command signal, the bootloader will execute the corresponding command to reset the device to a default configuration, to revert to a previous firmware version, or to achieve another predetermined configuration.

Exemplary Application: Internet-Protocol (IP) Telephones

Organizations oftentimes are distributed across many physical locations. For example, a company may have their headquarter office in San Jose, Calif., and may have satellite offices in New York, as well as in various countries such as England, China, etc. As these companies scale, they can create a local information infrastructure within each new office building, such that each local infrastructure can include one or more network routers or switches (e.g., switches 978.2 and 978.*n* within LAN 976.*m*).

Hence, because these network routers and switches can be monitored, controlled, and/or configured via a cloud-based service provided by computer cluster 972, it is possible for a few network administrators to maintain these local information infrastructures, even though they are spread across various physical locations. For example, as each satellite office hires new employees, a network administrator located at the headquarter office can use computer cluster 972 to configure an IP telephone for these new employees. Configuring an IP telephone can involve provisioning the IP telephone to a router or switch of the computer network (e.g., switch 978.*n* in LAN 976.2).

Further, as upgrades become available for these IP telephones over time, it is possible for the network administrator to perform a simultaneous firmware upgrade for these IP telephones. For example, the network administrator can interact with a UI provided by computer cluster 972 to select the plurality of IP telephones, which are accessible via network router or switch 978.1 of LAN 976.1, and/or via network routers or switches 978.2 and 978.*n* of LAN 976.*m*. The network administrator can then select a "upgrade firmware" button to upgrade the firmware for these devices to a recent version. At this point, the controller on computer cluster 972 (or, alternatively, each network router/switch 978) may upload the recent firmware version to each of the target network devices. The central controller then sends a command to each network router/switch 978 to load the new firmware version.

When network routers and/or switches 978 receive the "upgrade firmware" command, which indicates MAC addresses for the IP telephones to upgrade, devices 978 begin by determining an Ethernet port for each MAC address. Then, the network routers/switches 978 reboot each IP telephone coupled to these Ethernet ports (e.g., but temporarily turning off power to these ports), and transmits a device-reset signal over these Ethernet ports while the attached IP telephones are running their bootloaders.

Figure 10:
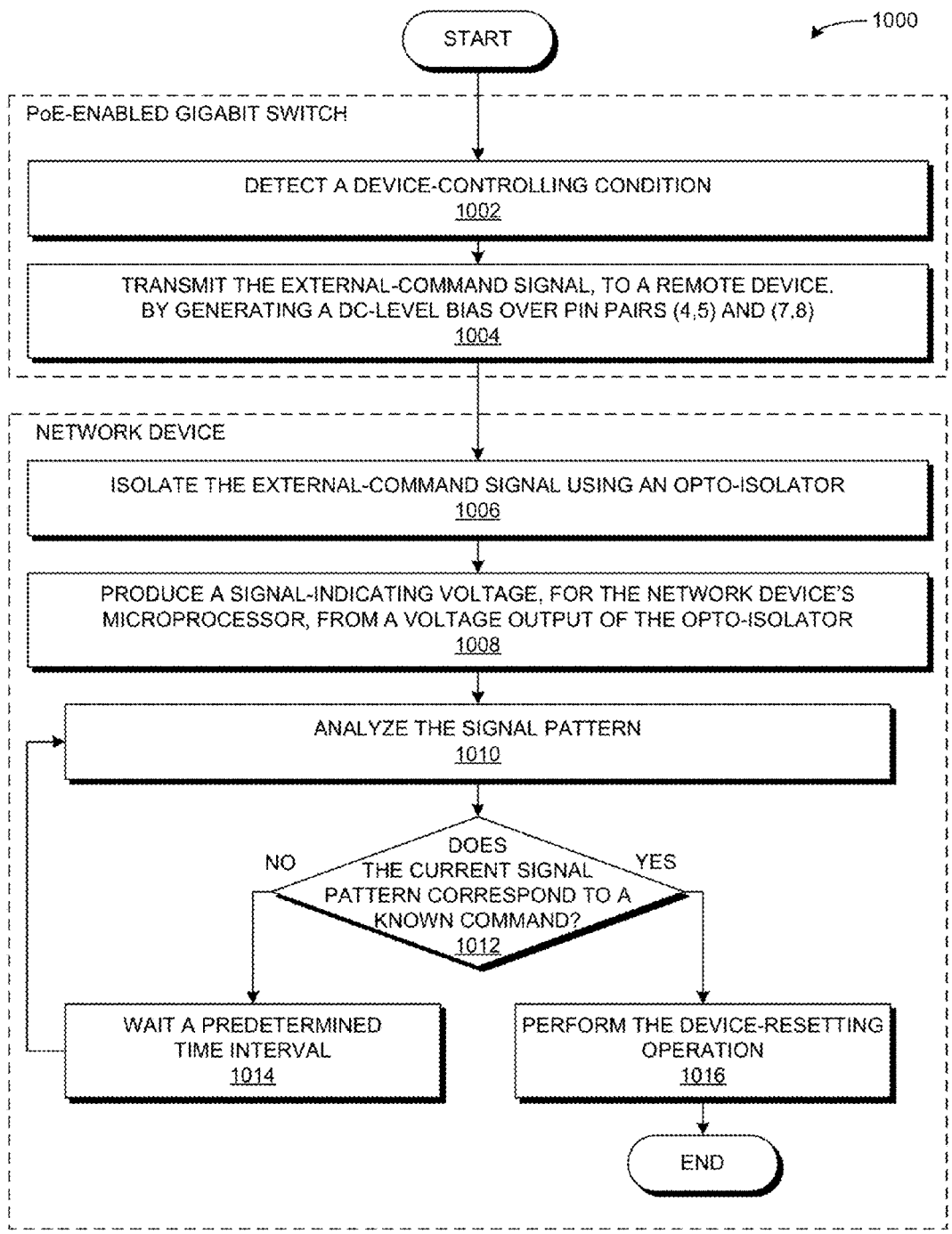
FIG. 10 presents a flow chart illustrating a method for resetting a remote network device, to a factory-default setting, remotely from a PoE-enabled network router or switch in accordance with an embodiment.

FIG. 10 presents a flow chart illustrating a method 1000 for remotely resetting a remote network device to factory-default settings from a PoE-enabled network switch in accordance with an embodiment. During operation, a PoE-enabled network switch can detect a device-controlling condition (operation 1002). The device-controlling condition can include a user pressing on an external-reset button next to an Ethernet port of the network switch, the user entering a command via a Web user interface of the network switch, or the network device entering a predetermined state (e.g., unresponsive). The PoE-enabled network switch then transmits an external-command signal to the remote network device by generating a DC-level bias over pin pairs (4,5) and (7,8) (operation 1004).

In some embodiments, the remote network device is only able to detect external-command signal pattern while executing a boot loader, prior to loading a firmware image. For example, the remote network device may only monitor pins (4,5) and (7,8) to detect such signal patterns while running the boot loader. As another example, the remote network device's firmware may monitor pins (4,5) and (7,8) to detect such signal patterns, but may ignore certain external-command signals that need to be processed by the boot loader. Hence, to transmit such an external-command signal to the remote device's boot loader, the PoE-enabled switch can perform operation 1004 by cycling power to the remote network device (e.g., to reboot the remote device), and transmits the external-command signal pattern over Ethernet pins (4,5) and (7,8) while the remote device is executing the boot loader.

At the other end of the network connection, the remote network device can isolate the external-command signal using an opto-isolator to safely detect high-voltage bias signals across pin pairs (4,5) and (7,8) (operation 1006). The network device then produces a voltage that corresponds to the incoming external-command signal, for the network device's microprocessor, from a voltage output of the opto-isolator (operation 1008).

Further, the network device's microprocessor monitors the reset-indicating voltage via a general-purpose input-output (GPIO) pin to ignore glitches in the signal pattern, and to identify any legitimate external-command signal patterns. During operation, the network device analyzes the signal pattern (operation 1010), and determines whether the signal pattern corresponds to a known command (operation 1012). If so, the network device performs an operation corresponding to the detected command (operation 1016), such as to enter a reboot process.

However, if the signal pattern does not correspond to a known command (e.g., a device-reset signal has occurred for less than a predetermined interval), the system can wait for a predetermined wait-time interval (operation 1014), and returns to operation 1010 to analyze the external-command signal pattern.

Figure 11:
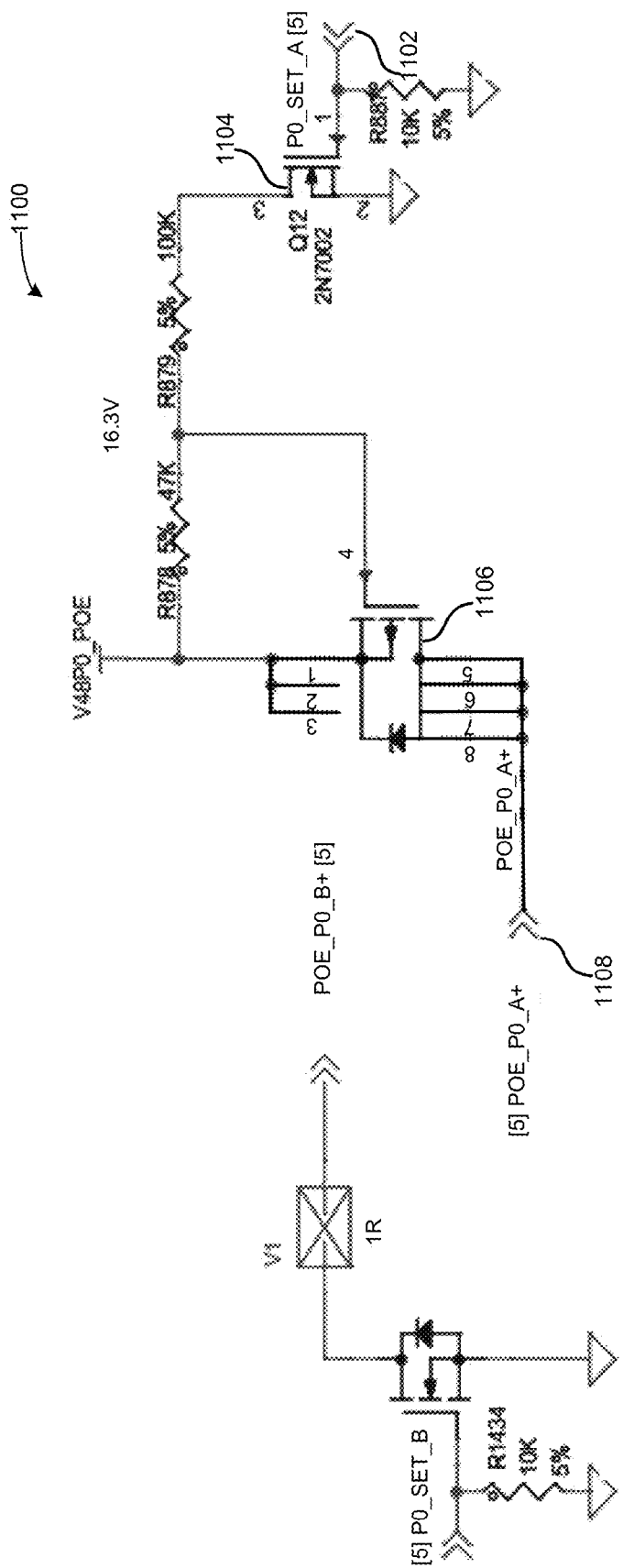
FIG. 11 illustrates a signal-generating circuit for generating a signal pattern that indicates a command for a remote device via a Gigabit-Ethernet cable in accordance with an embodiment.

FIG. 11 illustrates a signal-generating circuit 1100 for generating a signal pattern that indicates a command for a remote device via a Gigabit-Ethernet cable in accordance with an embodiment. For example, during operation 1004 of FIG. 10, the PoE-enabled Gigabit switch can use signal-generating circuit 1100 to generate and transmit the external-command signal for a corresponding port of the Gigabit switch. If the Gigabit switch includes a plurality of Ethernet ports, the Gigabit switch can include an instance of signal-generating circuit 1100 for each port of the Gigabit switch.

During operation, the Gigabit switch's microprocessor can generate and transmit the external-command signal pattern over a GPIO pin, which causes signal-generating circuit 1100 to generate and transmit the external-command signal as a differential signal over Ethernet pins (4,5) and (7,8). Signal-generating circuit 1100 can include an input pin 1102, which receives the external-command signal pattern from the microprocessor's GPIO pin. Signal-generating circuit 1100 can also include a load switch, which conducts an "on" or "off" signal to a transistor 1106. When the gate of transistor 1106 receives a voltage above a predetermined threshold voltage, transistor 1106 provides a DC voltage 1106 (e.g., 48 V DC-level bias) to an Ethernet output data pin (e.g., Ethernet pins (7,8)).

In some embodiments, signal-generating circuit 1100 provides a constant 48V DC bias to Ethernet pins (4,5). Hence, when transistor 1106 also provides a 48 V DC bias to pins (7,8), the output differential produced by pin pairs (4,5) and (7,8) is near 0 V, thus producing a logic zero signal. On the other hand, when transistor 1106 provides a lower DC bias to pins (7,8) (e.g., 0V), the output differential produced by pins (4,5) and (7,8) is substantially high (e.g., 48V), thus producing a logic one signal.

Figure 12:
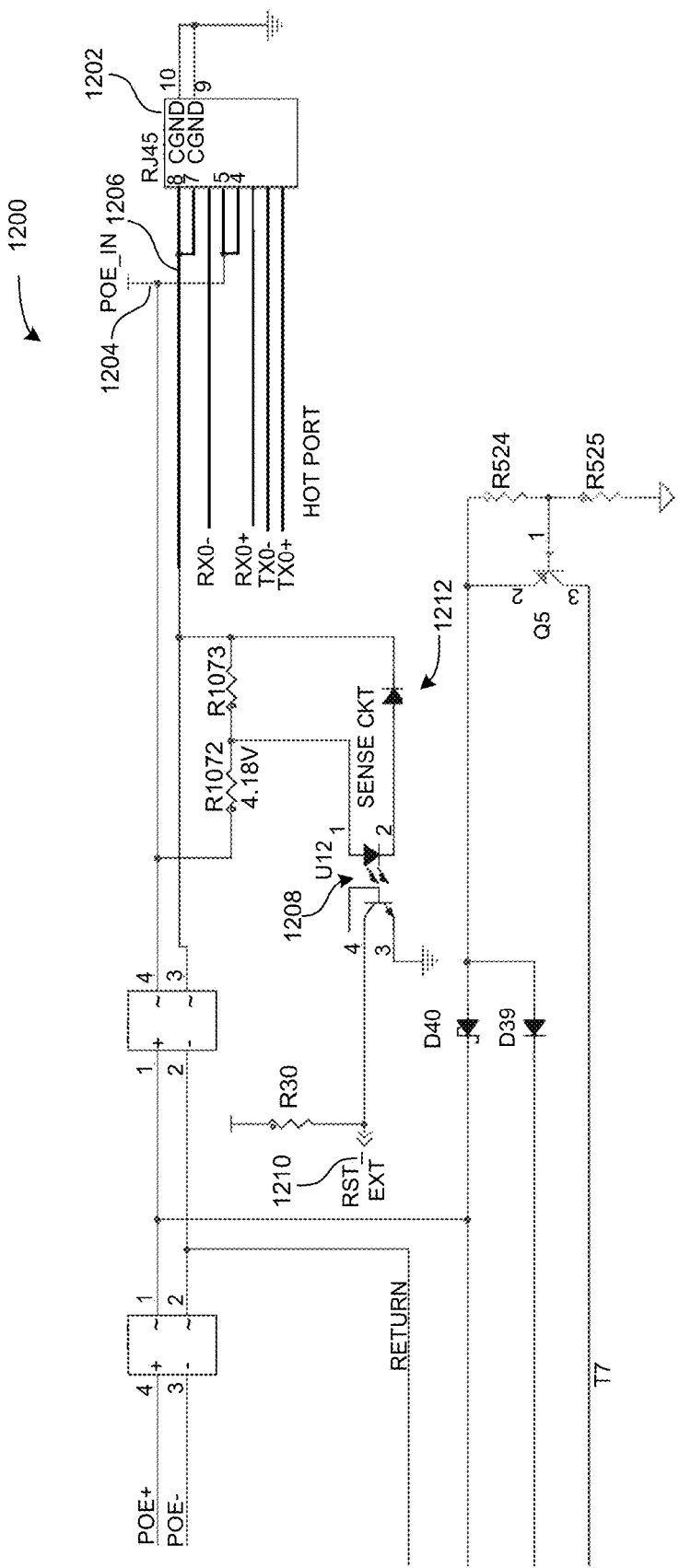
FIG. 12 illustrates a signal detector for detecting a signal pattern that indicates a command from a remote device via a Gigabit-Ethernet cable in accordance with an embodiment.

FIG. 12 illustrates a signal detector 1200 for detecting a signal pattern that indicates a command from a remote device via a Gigabit-Ethernet cable in accordance with an embodiment. Signal detector 1200 can include an opto-isolator 1208, whose anode is coupled to a PoE signal 1204 from pin pairs (4,5) of an Ethernet port 1202, and whose cathode is coupled to a signal 1206 from pin pairs (7,8) of Ethernet port 1202. During normal operation, while an external-command signal is not being transmitted, both PoE signal 1204 and signal 1206 carry a 48 V DC signal. Hence, the voltage difference across opto-isolator 1208 is not large enough to produce a high voltage at signal 1210.

In some embodiments, when an external-command signal is being transmitted, signal 1206 carries a lower DC signal (e.g., a 0 V or 24 V DC signal), which results in a non-zero differential across opto-isolator 1208 (e.g., 24 V, or 48 V). This large voltage differential activates an emitter within opto-isolator 1208, which emits a light source that activates a light sensor (e.g., a phototransistor) within opto-isolator 1208. Hence, when an external-reset signal is being transmitted via pin pairs (7,8) of Ethernet port 1202, the light sensor within opto-isolator 1208 produces a DC voltage at signal 1210.

Signal 1210 can be coupled to a general purpose input/output (GPIO) pin of the network device's processor. While the network device is running a boot loader that loads the firmware, the boot loader can periodically poll the voltage level from signal 1210 (e.g., at a predetermined polling frequency) to determine whether a signal is being received for a known command. If the boot loader detects a possible command via signal 1210, the boot loader can periodically poll signal 1210 (e.g., at a higher signal-analyzing frequency) to determine whether the detected signal pattern corresponds to a legitimate command.

For example, the boot loader can follow a state machine based on the signal values detected via signal 1210. If a signal is detected for at least a predetermined period of time (e.g., 8 seconds), the boot loader can determine that a device-resetting signal has been detected. In response to detecting the device-resetting signal, the boot loader can reconfigure itself to load from factory-default settings. Alternatively, if a signal is detected that includes at least two consecutive pulses which repeat a two-second high-voltage signal followed by a one-second pause, the boot loader can determine that a firmware-reset signal has been detected. Then, in response to detecting the firmware-reset signal, the boot loader reconfigures itself to load from a previous firmware version (e.g., stored in a local FLASH storage device). The boot loader and/or the firmware of the network device may also be capable of detecting and responding to other device-controlling signal patterns now known or later developed.

In some embodiments, signal detector 1200 can also include a diode 1212 oriented in series with the diode of opto-isolator 1208. Diode 1212 prevents a strong current from traveling to the opto-isolator 1208 in the reverse direction (e.g., from the cathode to the anode of opto-isolator 1208), hence protecting opto-isolator 1208.

PoE-Enabled Gigabit Access Point

In some embodiments, a PoE-enabled Access Point (e.g., AP 402 of FIG. 4, or AP 502 of FIG. 5B) can provide 24 Volt 0.5 Amp power, and a Gigabit network access to an attached network device. Specifically, the Gigabit AP device can include signal generating circuit 1100 to transmit an external-command signal to a remote network device as described in FIG. 10. This allows a user to access a user interface hosted the Gigabit AP device to configure the attached network device in a desired way. For example, the user can configure the Gigabit AP device to force a reboot cycle on the remote device (e.g., by turning off power to the remote device for a predetermined time interval), to reset the remote device to a previous firmware version, or to reset the remote device to a default firmware version.

The Gigabit AP device can also include signal detector 1200 for detecting an external-command signal pattern from a network source (e.g., from Gigabit switch 902 of FIG. 9). This allows a user to reset the Gigabit AP device to a previous firmware version, or to a default firmware version, via a user interface hosted by the Gigabit switch.

The methods and processes described in the detailed description section can be embodied as code and/or data, which can be stored in a computer-readable storage medium. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A Power-over-Ethernet injecting apparatus, comprising:
a power connector for receiving a first electric power signal;
a power-converting circuitry for converting the first electric power signal to a second electric power signal, wherein the second electric power signal is a direct current (DC) signal;
a first network port that facilitates coupling the apparatus to a local-area network (LAN);
a second network port that facilitates coupling the apparatus to a network device, wherein the second network port comprises a set of power pins for providing the second electric power signal and a separate set of data pins for providing access to the LAN of the first network port; and
an external-reset circuitry, wherein the external-reset circuitry is activated, the external-reset circuitry is configured to generate a reset-control signal and transmit the reset-control signal to the network device, wherein the reset-control signal is in form of a DC-voltage bias applied on a data pin separate from the set of power pins of the second network port.

2. The apparatus of claim 1, wherein at least the second network port includes an RJ45 port, wherein the DC-voltage bias is applied on pin 3 of the RJ45 port, and wherein the second electric power signal includes a Power-over-Ethernet (PoE) signal.

3. A network apparatus that receives power over Ethernet, the apparatus comprising:
a first network port, wherein when the first network port is coupled to a network port of a first external device, the first network port receives a power signal from the first external device via a set of power pins;
a second network port that facilitates coupling the network apparatus to a local-area network (LAN), wherein the second network port comprises a set of data pins separate from the set of power pins of the first network port; and
a wireless circuitry to provide a wireless network connection to the LAN accessible via the set of data pins of the second network port, wherein the wireless circuitry receives power from the set of power pins of the first network port; and
an external-reset-monitoring circuitry configured to monitor a DC-voltage bias on a data pin of the second network port separate from the power pins of the first network port, wherein the external-reset-monitoring circuitry is configured to generate a reset signal in response to determining that the DC-voltage bias on the data pin is at least equal to a predetermined level.

4. The apparatus of claim 3, further comprising a device-resetting circuitry;
wherein the external-reset-monitoring circuitry detects a device-reset signal from the data pin of the second network port, the device-resetting circuitry is further configured to reset a factory-default setting; and
wherein when the external-reset-monitoring circuitry detects a firmware-reset signal from the data pin of the second network port, the device resetting circuitry is further configured to reset to a previous firmware version.

5. The apparatus of claim 4, wherein the device-reset signal comprises a single pulse signal with a predetermined time-period.

6. The apparatus of claim 4, wherein the firmware-reset signal comprises:
a first pulse signal whose duration is at least equal to a first time period;
a second pulse signal, transmitted after the first pulse signal, whose duration is at least equal to a second time period; and
a third pulse, transmitted after the second pulse signal, whose duration is at least equal to the first time period.

7. The apparatus of claim 3, further comprising:
a third network port to provide a second external device access to the LAN, wherein the third network port is coupled to the set of power pins of the first network port to facilitate providing power to the second external device.

8. The apparatus of claim 7, further comprising:
an external-reset circuitry, wherein when the external-reset circuitry is activated, the external-reset circuitry alters a DC-voltage bias for a data pin of the third network port.

9. The apparatus of claim 3, wherein at least the first network port includes an RJ45 port, and wherein the power signal includes a Power-over-Ethernet (PoE) signal.

10. The apparatus of claim 3, wherein the first network port and the second network port are realized using a single network port.

11. The apparatus of claim 3, wherein the power signal provides 0.5 amps of electric current.

12. The apparatus of claim 3, wherein the power signal provides 24 volts.

13. The apparatus of claim 3, wherein the power signal provides 48 volts.

14. The apparatus of claim 3, wherein the wireless circuitry includes a 2.4 GHz antenna.

15. The apparatus of claim 3, wherein the wireless circuitry implements a wireless access point.

16. A network apparatus for providing power over an Ethernet connection to a plurality of network devices, comprising:
- a power connector for receiving a first electric power signal; a power-converting circuitry for converting the first electric power signal to a second electric power signal, wherein the second electric power signal is a direct current (DC) signal;
- a first network port that facilitates coupling the apparatus to a local-area network (LAN);
- a set of power-coupling network ports that facilitates coupling the apparatus to the network devices, wherein a respective power-coupling network port comprises a set of power pins for providing the second electric power signal and a separate set of data pins for providing access to the LAN of the first network port; and
- a set of external-reset circuitry, wherein when an external-reset circuitry is activated, the external-reset circuitry is configured to generate a reset control signal and transmit the reset-control signal to a corresponding network device, wherein the reset control signal is in form of a DC voltage bias applied on a data pin separate from the set of power pins of a corresponding power-coupling network port.

17. The apparatus of claim 16, wherein a respective external-reset circuitry includes a push-button.

18. The apparatus of claim 16, further comprising:
a processor; and
a memory.

19. The apparatus of claim 18, wherein a respective external-reset circuitry includes an active circuit comprising:
- an input-signal terminal configured to receive a reset signal, from the processor, for the corresponding power-coupling network port; and
- an output-signal terminal coupled to the data pin of the corresponding power-coupling network port; and
- wherein when the input-signal terminal receives a first voltage level associated with a reset signal, the external-reset circuitry alters the DC bias, for the output-signal terminal, that transmits the reset signal over the data pin of the corresponding power-coupling network port.

20. The apparatus of claim 18, wherein the processor is configured to generate an external-device-controlling pulse signal for an external-reset circuitry of the corresponding power-coupling network port, wherein the pulse signal includes one or more of:
- a device-reset signal for reverting a remote device's configuration to factory-default settings; and
- a firmware-reset signal for reverting the firmware of a remote device to a previous firmware version.

21. The apparatus of claim 20, wherein the device-reset signal comprising a single pulse signal with a predetermined time-period.

22. The apparatus of claim 20, wherein the firmware-reset signal includes:
- a first pulse signal whose duration is equal to at least a first time interval;
- a second pulse signal, transmitted after the first pulse signal, whose duration is equal to at least a second time interval; and
- a third pulse, transmitted after the second pulse signal, whose duration is equal to at least the first time interval.

23. A method for resetting a configuration of a remote network device, comprising:
- detecting, by a local network device, a command to reset the remote network device, wherein the local network device is configured to provide network access to the remote network device via an Ethernet connection, wherein the Ethernet connection includes a set of power pins for providing power to the remote network device and a separate set of data pins for providing the network access;
- in response to detecting the reset command, generating an external-reset signal by applying a DC voltage bias on a data pin separate from the power pins of the Ethernet connection; and
- transmitting the external-reset signal to the remote device.

24. The method of claim 23, wherein detecting the command to reset the remote network device involves determining that a user has pressed a physical button for at least a predetermined time interval, wherein the physical button is mounted on the local network device for resetting the remote network device.

25. The method of claim 23, wherein detecting the command to reset the remote network device involves determining that a user has activated a user-interface button, presented by a device-controlling user interface of the local network device, for resetting the remote network device.

26. The method of claim 23, wherein the external-reset signal includes a device-reset signal for reverting the remote network device's configuration to a factory-default setting; and
- wherein the device-reset signal comprises a single pulse signal whose duration is equal to at least a predetermined time interval.

27. The method of claim 23, wherein the external-reset signal includes a firmware-reset signal for reverting the firmware of a remote device to a previous firmware version; and
- wherein the firmware-reset signal includes:
  - a first pulse signal whose duration is equal to at least a first time interval;
  - a second pulse signal, transmitted after the first pulse signal, whose duration is equal to at least a second time interval; and
  - a third pulse, transmitted after the second pulse signal, whose duration is equal to at least the first time interval.

* * * * *